(12) United States Patent
Park et al.

(10) Patent No.: US 11,360,598 B2
(45) Date of Patent: Jun. 14, 2022

(54) ELECTRONIC DEVICE INCLUDING FLEXIBLE DISPLAY CAPABLE OF CHANGING SIZE OF DISPLAY AREA AND METHOD FOR CONTROLLING SAME

(71) Applicant: Samsung Electronics Co., Ltd., Suwon-si (KR)

(72) Inventors: Hongsik Park, Suwon-si (KR); Gidae Kim, Suwon-si (KR); Jungjin Kim, Suwon-si (KR); Hyoseok Na, Suwon-si (KR); Jongchul Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/160,856

(22) Filed: Jan. 28, 2021

(65) Prior Publication Data

US 2021/0149515 A1 May 20, 2021

Related U.S. Application Data

(63) Continuation of application No. 16/440,493, filed on Jun. 13, 2019, now Pat. No. 10,936,100.

(30) Foreign Application Priority Data

Jun. 14, 2018 (KR) .................. 10-2018-0068398

(51) Int. Cl.
*G06F 3/041* (2006.01)
*G06F 1/16* (2006.01)
(Continued)

(52) U.S. Cl.
CPC .......... *G06F 3/0412* (2013.01); *G06F 1/1643* (2013.01); *G06F 1/1652* (2013.01); *G06F 3/044* (2013.01); *G06F 3/04817* (2013.01)

(58) Field of Classification Search
CPC ............... G06F 1/1652; G06F 3/04817; G06F 2203/04102; G06F 1/1624; G06F 3/0482; G06F 1/1677; G06F 2203/04803
See application file for complete search history.

(56) References Cited

U.S. PATENT DOCUMENTS

| 2013/0058063 A1 | 3/2013 | O'Brien |
| 2013/0201208 A1 | 8/2013 | Cho et al. |

(Continued)

FOREIGN PATENT DOCUMENTS

| JP | 2018-088264 A | 6/2018 |
| KR | 10-2014-0016082 A | 2/2014 |

(Continued)

OTHER PUBLICATIONS

International Search Report and Written Opinion dated Nov. 28, 2019, issued in International Patent Application No. PCT/KR2019/007166.

(Continued)

*Primary Examiner* — Mark W Regn
(74) *Attorney, Agent, or Firm* — Jefferson IP Law, LLP

(57) ABSTRACT

An electronic device according to various embodiments includes a first structure capable of moving between a closed state and an open state with regard to a second structure, a second structure, a flexible touchscreen display layer comprising a planar portion and a bendable portion, a processor operatively connected to the flexible touchscreen display layer, and a memory operatively connected to the processor. The memory stores instructions that when executed, enable the processor to perform operations of displaying at least one first object in a first area of the planar portion and displaying at least one second object in a second area of the planar portion in the closed state, and displaying the at least one object in the first area and displaying the at least one (Continued)

second object in a third area of the bendable portion in the open state.

20 Claims, 29 Drawing Sheets

(51) Int. Cl.
*G06F 3/04817* (2022.01)
*G06F 3/044* (2006.01)

(56) References Cited

U.S. PATENT DOCUMENTS

| | | |
|---|---|---|
| 2013/0234951 A1 | 9/2013 | Kim et al. |
| 2014/0028596 A1 | 1/2014 | Seo et al. |
| 2014/0211399 A1* | 7/2014 | O'Brien ................ G06F 1/1652 361/679.26 |
| 2014/0320393 A1 | 10/2014 | Modarres et al. |
| 2016/0033999 A1 | 2/2016 | Browning |
| 2016/0212837 A1 | 7/2016 | Kim |
| 2016/0259514 A1 | 9/2016 | Sang et al. |
| 2017/0140504 A1* | 5/2017 | Jeong ........................ G06T 3/40 |
| 2017/0147189 A1* | 5/2017 | Ryu .................... G06F 3/04817 |
| 2017/0154609 A1 | 6/2017 | Yoon et al. |
| 2017/0196103 A1 | 7/2017 | Cho et al. |
| 2017/0199712 A1 | 7/2017 | Lee et al. |
| 2018/0120954 A1 | 5/2018 | Seo et al. |

FOREIGN PATENT DOCUMENTS

| | | |
|---|---|---|
| KR | 10-2014-0059274 A | 5/2014 |
| KR | 10-2016-0108705 A | 9/2016 |

OTHER PUBLICATIONS

Korean Office Action dated Mar. 8, 2021, issued in Korean Application No. 10-2018-0068398.

Extended European Search Report dated Mar. 18, 2021, issued in European Application No. 19819118.1-1203.

* cited by examiner

ELECTRONIC DEVICE INCLUDING FLEXIBLE DISPLAY CAPABLE OF CHANGING SIZE OF DISPLAY AREA AND METHOD FOR CONTROLLING SAME

CROSS-REFERENCE TO RELATED APPLICATION(S)

This application is a continuation application of prior application Ser. No. 16/440,493, filed on Jun. 13, 2019, which is based on and claims priority under 35 U.S.C. § 119(a) of a Korean patent application number 10-2018-0068398, filed on Jun. 14, 2018, in the Korean Intellectual Property Office, the disclosure of which is incorporated by reference herein in its entirety.

BACKGROUND

1. Field

The disclosure relates to an electronic device including a flexible display capable of changing the size of a display area, and a method for controlling the same.

2. Description of Related Art

An electronic device (for example, a mobile phone) can output stored information as a sound or an image. With the increase of the degree of integration of electronic devices and the popularization of hyper-speed and high-capacity wireless communication, recently, a single mobile communication terminal has various functions. For example, an entertainment function, such as a game, a multimedia function, such as reproducing music/moving images, a communication and security function for mobile banking, a scheduling function, an electronic wallet function, etc. are integrated into a single electronic device, in addition to a communication function.

Electronic devices are normally equipped with a planar plate-type display device and a battery, and have a bar-type, folder-type, or sliding-type exterior depending on the shape of the display device or the battery. Electronic devices having a large screen have recently appeared such that users can watch images comfortably.

In order to conveniently carry such electronic devices having a large screen, electronic devices employing a flexible display (or variable display) have been commercialized. An electronic device may include a flexible display such that various screens can be provided visually through the flexible display. The flexible display may include a display panel and a display driver integrated circuit (DDI) for driving the panel. The DDI mounted on the electronic device may receive display data from a processor and drive the display panel accordingly.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a flexible display may output an application, which is being executed, on the flexible display. At least a partial surface of the flexible display may be arranged on the front and rear surfaces of the electronic device so as to form a curved line.

According to various embodiments, the screen of the application may be configured such that, for example, when a movement of a structure that forms the electronic device changes the screen to an open or closed state, the size of the display area is changed.

For example, in response to a change in size of the displayed screen area, the display method or arrangement of respective objects may vary. If respective objects are displayed identically without reflecting the attributes thereof in spite of a change in size of the screen area displayed by the flexible display, the user experience (UX) may degrade.

According to various embodiments, an electronic device may add an attribute to objects displayed on the screen in various situations in which the screen size of the flexible display is changed, and may display the objects on the screen on the basis of the attribute.

Additional aspects will be set forth in part in the description which follows and, in part, will be apparent from the description, or may be learned by practice of the presented embodiments.

In accordance with an aspect of the disclosure, an electronic device is provided. The electronic device includes a first structure including a first plate including a first surface and a second surface facing in an opposite direction to the first surface, a second structure including a second plate facing the second surface of the first plate, a first sidewall which is perpendicular to the second plate, a second sidewall which is perpendicular to the second plate and to the first sidewall, and a third sidewall which is perpendicular to the first sidewall and to the second plate, and which is parallel with the second sidewall, the second plate, the first sidewall, the second sidewall, and the third sidewall forming a trough, one side of which is open, so as to contain at least a part of the first structure, the first structure being able to move between a closed state and an open state with regard to the second structure in a first direction which is parallel with the second plate and with the second sidewall, the first structure being positioned at a first distance from the first sidewall in the closed state and being positioned at a second distance, which is larger than the first distance, from the first sidewall in the open state, a flexible touchscreen display layer including a planar portion which extends across at least a part of the first surface, and which is mounted on the first surface, and a bendable portion which extends from the planar portion such that, in the closed state, the bendable portion extends to a space between the first sidewall and the first structure, at least part of the bendable portion being pulled from the space when the first structure is moved from the closed state to the open state such that, when seen from above the first plate, the at least part of the bendable portion forms a substantially planar surface between the planar portion and the first sidewall, a processor operatively connected to the flexible touchscreen display layer, and a memory operatively connected to the processor. The memory may store instructions that when executed, enable the processor to display at least one first object in a first area of the planar portion, display at least one second object in a second area of the planar portion in the closed state, and display the at least one first object in the first area and to display the at least one second object in a third area of the bendable portion in the open state.

In accordance with another aspect of the disclosure, an electronic device is provided. The electronic device includes a first structure including a first plate with a first surface and a second surface facing in an opposite direction to the first surface, a second structure including a second plate facing the second surface of the first plate, the second structure having a space formed therein such that at least a partial area of the first plate can be at least partially contained in the space, the first plate being capable of moving in a first direction with regard to the second structure so as to reach an open state related to the second structure and moving in a second direction, which is opposite to the first direction, with regard to the second structure so as to reach a closed state related to the second structure such that the first plate can move between the open state and the closed state, a flexible touchscreen display including a planar portion with a flexible area which is mounted on the first surface of the first plate, and which can be at least partially contained in the space, the planar portion expanding across at least a part of the first surface, and the flexible touchscreen display including a bendable portion which expands from the planar portion to the space in the closed state, at least a part of the bendable portion being pulled from the space so as to form a substantially planar surface, when seen from above the first plate, between the planar portion and the second structure when the first plate moves from the closed state to the open state, a processor operatively connected to the flexible touchscreen display, and a memory operatively connected to the processor. The memory may store instructions that when executed, enable the processor to: confirm a change in size of a screen of the flexible touchscreen display, which is visually exposed to the outside, by sensing a movement of the first plate, store a value corresponding to the changed size of the screen, determine whether or not position compensation is to be applied to at least one object which is to be displayed on the screen, and display a position-compensated object based on the stored value with regard to the at least one object to which position compensation is to be applied.

According to various embodiments, an electronic device including a flexible display may display respective objects that constitute the screen of the flexible display in view of the attribute of the objects in various situations in which the screen size of the flexible display is changed, thereby providing a user interface (UI) or a UX that the user finds convenient to use.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
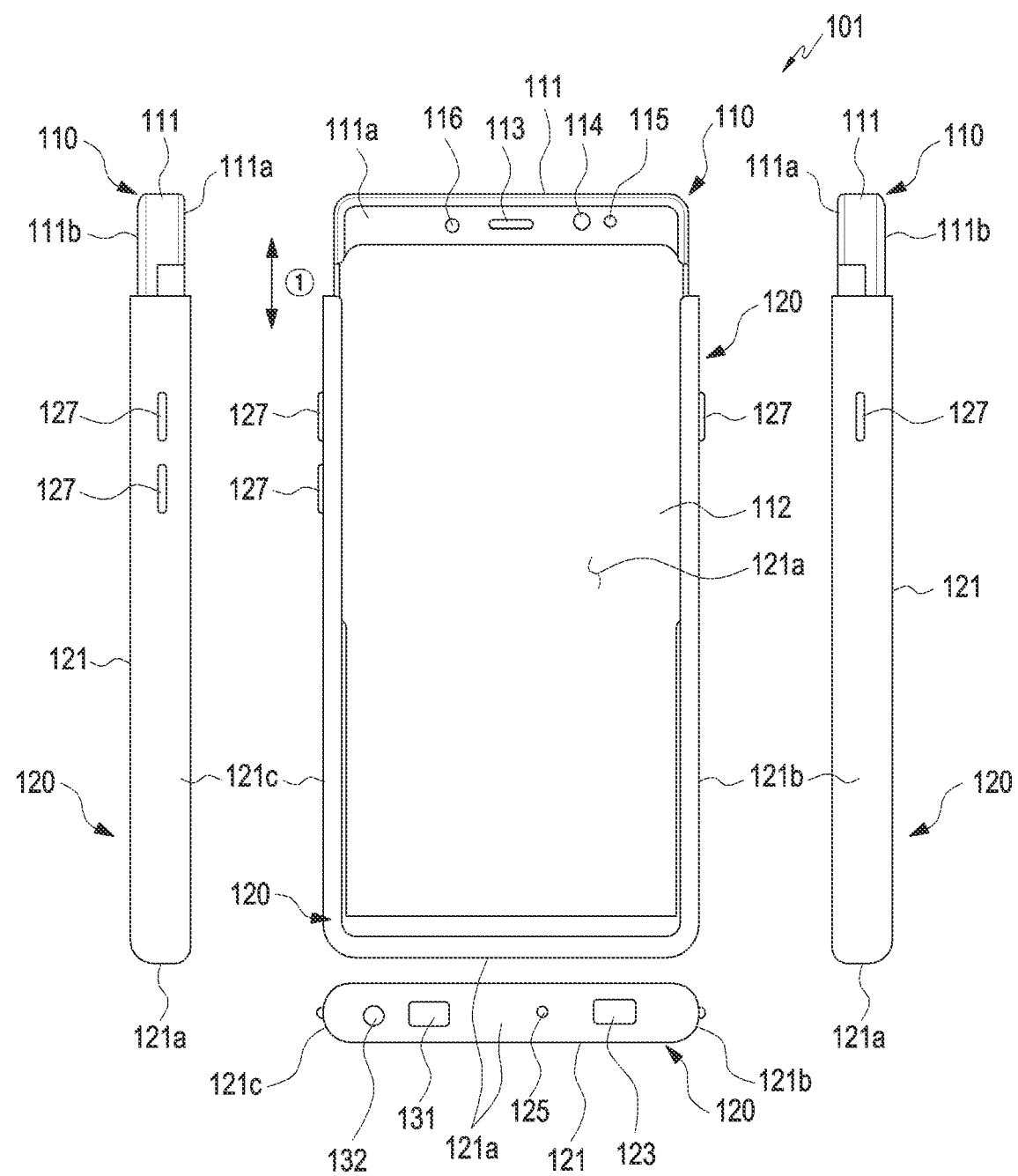
FIG. 1A is a diagram illustrating a closed state of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made, without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order are determined in the mentioned order or arbitrarily and may not be arbitrarily changed if necessary.

In the disclosure, the terms are used to describe specific embodiments, and are not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the specification.

In the disclosure, an electronic device may be a random device, and the electronic device may be called a terminal, a portable terminal, a mobile terminal, a communication terminal, a portable communication terminal, a portable mobile terminal, a touch screen or the like.

For example, the electronic device may be a smartphone, a portable phone, a game player, a television (TV), a display unit, a heads-up display unit for a vehicle, a notebook computer, a laptop computer, a tablet personal computer (PC), a personal media player (PMP), a personal digital assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless LAN (WLAN), a wide area network (WAN), an Internet, a small area network (SAN) or the like, but is not limited thereto.

Various embodiments described below are applicable to any electronic device capable of changing the size of the screen area displayed on the front surface thereof. According to various embodiments, an electronic device having a flexible display that is rolled into the opposite side (rollable display) will be described as an electronic device in the embodiments described below.

FIG. 1A is a diagram illustrating a closed state of an electronic device 101 according to an embodiment of the disclosure.

Figure 1B:
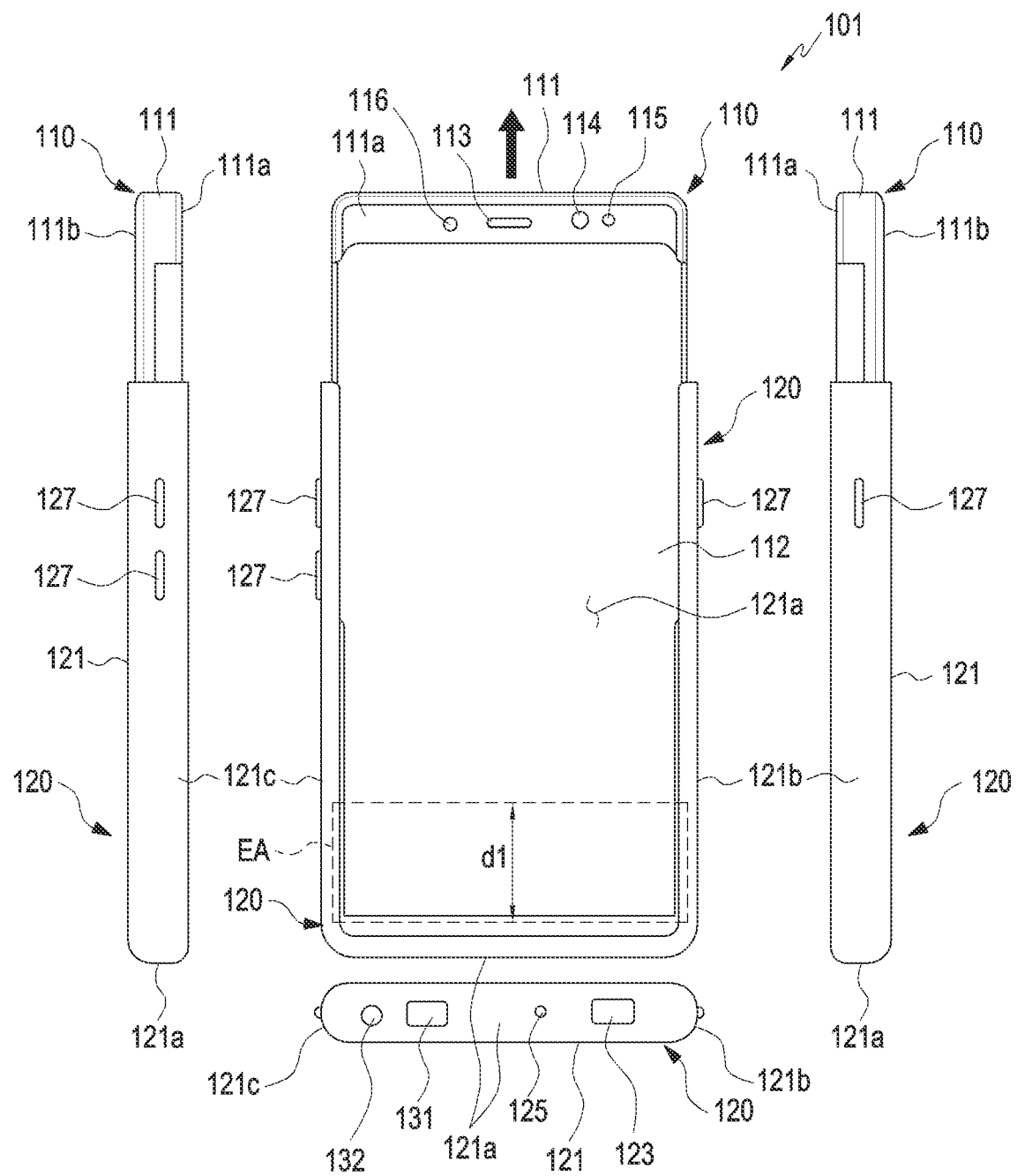
FIG. 1B is a diagram illustrating an open state of the electronic device of FIG. 1A according to an embodiment of the disclosure.

FIG. 1B is a diagram illustrating an open state of the electronic device 101 of FIG. 1A according to an embodiment of the disclosure.

Figure 1C:
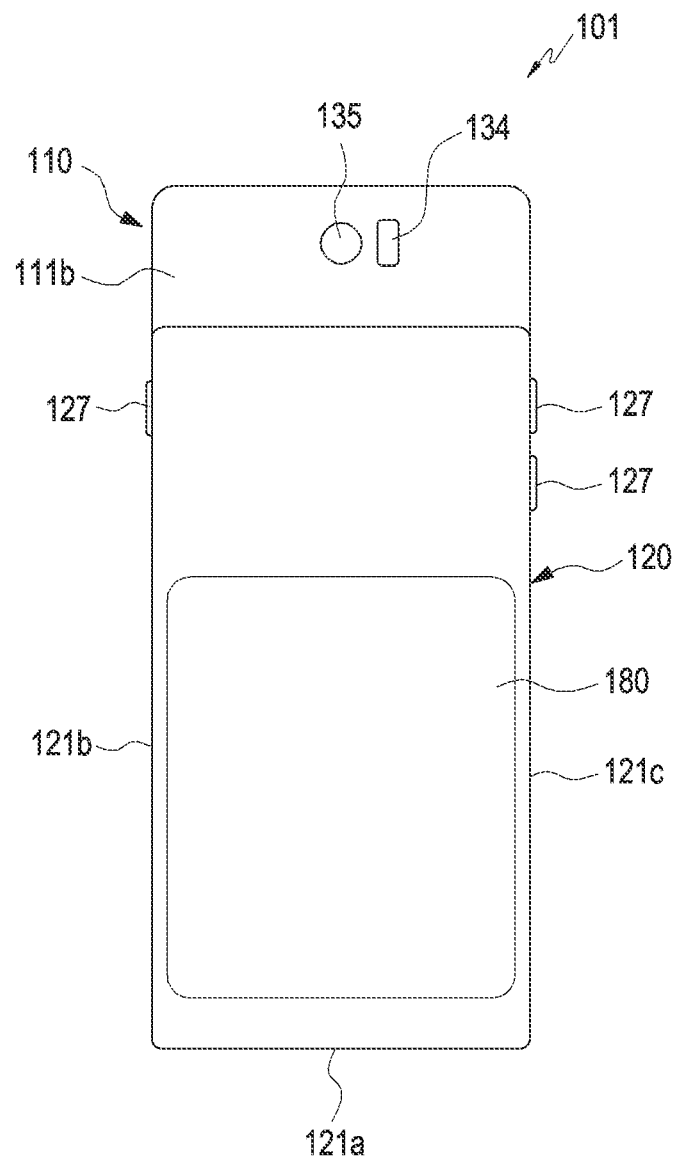
FIG. 1C is a diagram illustrating the rear side of the electronic device of FIG. 1A according to an embodiment of the disclosure.

FIG. 1C is a diagram illustrating the rear side of the electronic device 101 of FIG. 1A according to an embodiment of the disclosure.

FIG. 1A illustrates a state in which the first structure 110 is closed with regard to the second structure 120, and FIG. 1B illustrates a state in which the first structure 110 is open with regard to the second structure 120.

Referring to FIG. 1A, FIG. 1B, and FIG. 1C, the electronic device 101 may include a first structure 110 and a second structure 120 arranged to be able to move with regard to the first structure 110. According to an embodiment, the first structure 110 may be arranged to be able to reciprocate by a predetermined distance (dl) in the illustrated direction with reference to the second structure 120.

According to various embodiments, the first plate 111 of the first structure 110 may include a first surface 111a and a second surface 111b facing in the opposite direction to the first surface 111a. According to an embodiment, the second structure 120 may include: a second plate 121; a first sidewall 121a extending from the second plate 121; a second sidewall 121b extending from the first sidewall 121a and from the second plate 121; and a third sidewall 121c or a second rear plate 180 (for example, a rear window) which extends from the first sidewall 121a and from the second plate 121, and which is parallel with the second sidewall 121b. According to an embodiment, the second plate 121, the first sidewall 121a, the second sidewall 121b, and the third sidewall 121c may form a trough 220a, one side of which is open, such that at least a part of the first structure 110 is contained therein. For example, the second structure 120 may be coupled so as to surround a part of the first structure 110, and the first structure 110 may reciprocate linearly along the direction of arrow □ with regard to the second structure 120. According to an embodiment, the second sidewall 121b or the third sidewall 121c may be omitted. According to an embodiment, the second plate 121, the first sidewall 121a, the second sidewall 121b, or the third sidewall 121c may be formed as an integrated structure. As another example, the second plate 121, the first sidewall 121a, the second sidewall 121b, or the third sidewall 121c may be formed as a separate structure and then coupled. According to an embodiment, the second rear plate 180 may cover at least a part of the display 112. According to various embodiments, the size of the display screen displayed on the front surface may be varied by lifting and lowering the second rear plate 180 in the upward/downward direction.

According to an embodiment, the first structure 110 may be able to move to an open state and to a closed state with regard to the second structure 120 in a first direction (for example, direction of arrow □) which is parallel with the second plate 121 and with the second sidewall 121b such that the first structure 110 is positioned at a first distance from the first sidewall 121a in the closed state and is positioned at a second distance from the first sidewall 121a, which is larger than the first distance, in the open state.

According to an embodiment, the electronic device 101 may include at least one of a display 112, audio modules 113 and 123, camera modules 115 and 135, an indicator 116 (for example, an light-emitting diode (LED) device), sensor modules 114 and 134, a key input device 127, or connector holes 131 and 132.

According to an embodiment, the display 112 may include a planar portion 112a which extends across at least a part of the first surface 111a, and which is arranged on the first surface 111a, and a bendable portion which extends from the planar portion 112a to the space between the first sidewall 121a and the first structure 110 in the closed state. According to an embodiment, at least a part of the bendable portion of the display may be configured to move toward the planar portion 112a by a predetermined display area (EA) in order to form a substantially planar surface, when seen from above the first plate 111, between the planar portion 112a and the first sidewall 121a when the first structure 110 moves from the closed state to the open state. The display 112 may be coupled to or arranged adjacent to a touch sensing circuit, a pressure sensor capable of measuring the intensity (pressure) of a touch, and/or a digitizer for detecting a stylus pen of a magnetic field type. For example, the display 112 may include a flexible touchscreen display layer.

According to an embodiment, the audio modules 113, 123, and 125 may include speaker holes 113 and 123 or a microphone hole 125. The speaker holes 113 and 123 may include a receiver hole 113 or an external speaker hole 123. A microphone may be arranged in the microphone hole 125 so as to acquire an external sound, and multiple microphones may be arranged therein, in some embodiments, such that the direction of the sound can be sensed. In some embodiments, the speaker holes 113 and 123 and the microphone hole 125 may be implemented as a single hole, or a speaker (for example, a piezoelectric speaker) may be included without the speaker holes 113 and 123. According to an embodiment, the receiver hole 113 may be arranged on the first structure 110, and the external speaker hole 123 or the microphone hole 125 may be arranged on the second structure 120. According to another embodiment, the external speaker hole 123 may be arranged on the second surface 111b of the first plate 111 or on a side surface of the first structure 110. According to another embodiment, the microphone hole 125 may be arranged on a side surface of the first structure 110.

According to an embodiment, the sensor modules 114 and 134 may generate an electric signal or a data value corresponding to the internal operating state of the electronic device 101 or the external environment state thereof. The sensor modules 114 and 134 may include, for example, a first sensor module 114 (for example, a proximity sensor) arranged on the first surface 111a of the first plate 111, and/or a second sensor module (not illustrated) (for example, a fingerprint sensor) arranged on the second surface 111b of the first plate 111, and/or a third sensor module 134 (for example, an heart rate monitor (HRM) sensor). The electronic device 101 may further include a sensor module (not illustrated), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor.

According to an embodiment, the camera modules 115 and 135 may include a first camera device 115 arranged on the first surface 111a of the first plate 111 and a second camera device 135 arranged on the second surface 111b thereof. The first camera device 115 or the second camera device 135 may include one lens or multiple lenses, an image sensor, and/or an image signal processor. According to an embodiment, the second camera device 135 may be arranged on a surface of the second structure 120.

According to an embodiment, the key input device 127 may be arranged on the second sidewall 121b of the second structure 120 or on the third sidewall 121c thereof. The electronic device 101 may include a key input device (not illustrated), for example, a home key button or a touch pad arranged in the periphery of the home key button. According to another embodiment, at least a part of the key input device 127 may be positioned in an area of the first structure 110.

According to an embodiment, the indicator 116 may be arranged on the first surface 111a of the first plate 111. The indicator 116 may include an LED, for example, as long as the state information of the electronic device 101 can be provided in an optical type.

According to an embodiment, the connector holes 131 and 132 may include a first connector hole 131 capable of containing a connector (for example, a USB connector) for transmitting/receiving power and/or data to/from an external electronic device, and/or a second connector hole (or an earphone jack) 132 capable of containing a connector for transmitting/receiving an audio signal to/from the external electronic device. According to an embodiment, the first connector hole 131 or the second connector hole 132 may be arranged on the first sidewall 121a of the second structure 120. According to another embodiment, the first connector hole 131 or the second connector hole 132 may be formed on a sidewall of the first structure 110.

Figure 2:
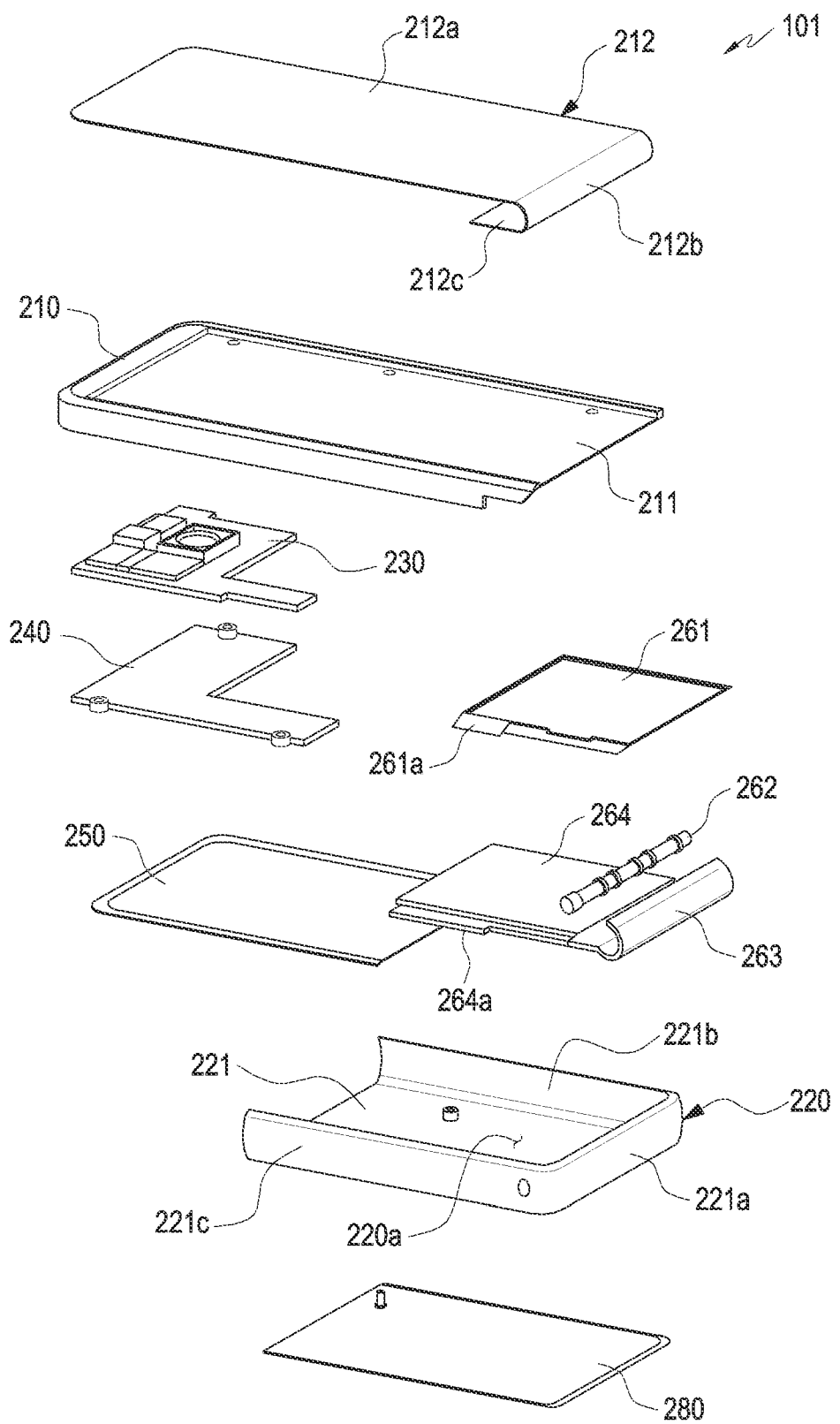
FIG. 2 is an exploded perspective view of an electronic device according to various embodiments.

FIG. 2 is an exploded perspective view of an electronic device 200 according to an embodiment of the disclosure.

Referring to FIG. 2, the electronic device 200 may include a display 212 (for example, the display 112 of FIG. 1A or a flexible touchscreen display layer); a first structure 210 (for example, the first structure 110 of FIG. 1A); a first plate 211; a second structure 220 (for example, the second structure 120 of FIG. 1A); a second plate 221; a printed circuit board 230; a first support member 240 (for example, a rear case); a first rear plate 250; a first hinge plate 261; a roller 262; a second hinge plate 264; or a second rear plate 280 (for example, a rear window). In some embodiments, at least one of the constituent elements of the electronic device 200 (for example, the first support member 240 or the first rear plate 250) may be omitted, or the same may further include another constituent element.

The display 212 may include a first surface 212a, a second surface 212b, and a third surface 212c, and the display area (for example, active area) of the screen may be changed on the basis of the exposed area according to various embodiments. The first surface 212a and the third surface 212c may form a planar surface, and the second surface 212b may form a curved surface. In an embodiment, the exposed area of the display 212 may vary depending on a movement of the first structure 210 with regard to the second structure 220, and the second surface 212b or the third surface 212c may form substantially the same planar surface with the first surface 212a successively or partially. For example, the second surface 212b or the third surface 212c may be exposed to the outside successively or selectively.

The first structure 210 may include a first plate 211. The first structure 210 may be made of a metallic material and/or a nonmetallic material (for example, polymer), for example. The display 212 (for example, the first surface 212a) may be coupled to one surface of the first plate 211, and the printed circuit board 230 may be coupled to the other surface thereof. The first plate 211 may be connected to one side of a multi-bar 263 which is at least connected to the second surface 212b of the display 212. The second structure 220 may fix the second hinge plate 264, and the first structure 210 may move while being guided by the second hinge plate 264.

The first hinge plate 261 may support the multi-bar 263 when the display 212 is expanded. For example, if the display 212 is expanded, the multi-bar 263 may be positioned on substantially the same plane with the first plate 211 while being supported by the first hinge plate 261. In an embodiment, when the display 212 is not expanded, the multi-bar 263 may be contained inside the second structure 220 and positioned substantially in parallel with the first plate 211, and may maintain the shape of a planar plate while being supported by the second hinge plate 264. The first hinge plate 261 and the first hinge plate fixing portion 261a may be formed integrally. The first hinge plate fixing portion 261a may be connected to the second hinge plate fixing portion 264a formed on the second hinge plate 264. In some embodiments, the first hinge plate 261 or the second hinge plate 264 may be fixed inside the second structure 220 so as to guide the movement of the first structure 210 with regard to the second structure 220.

The roller 262 may guide or support the multi-bar 263 such that the same can move with a predetermined radius. The roller 262 may be connected to the second hinge plate fixing portion 264a or the first hinge plate 261. For example, when the first plate 211 (for example, the first structure 110) moves with regard to the second structure 210, the roller 262 may rotate and guide the multi-bar 263 to the outside or inside of the second structure 220.

The multi-bar 263 may include multiple straight rods. The multi-bar 263 may support at least a part of the second surface 212b of the display 212. The multi-bar 263 may be contained in the second structure 220 while being partially supported by the second hinge plate 264, and the other side of the multi-bar 263 may be connected to the first structure 210.

The second hinge plate 264 may support the third surface 212c of the display 212. The second hinge plate 264 may support the multi-bar 263, when the display 212 is expanded, such that the same maintains the shape of a planar plate. The second hinge plate 264 may be formed as a component separate from the second hinge plate fixing portion 264a. The second hinge plate 264 may, while being fixed to the second structure 220, guide the sliding movement of the first structure 210 with regard to the second structure 220 by using the second hinge plate fixing portion 264a.

The second structure 220 may be formed to surround at least a part of the first structure 210, the second hinge plate 264, the multi-bar 263, and the like. According to an embodiment, the second structure 220 may include a second plate 221; a first sidewall 221a extending from the second plate 221; a second sidewall 221b extending from the first sidewall 221a and from the second plate 221; and a third sidewall 221c which extends from the first sidewall 221a and from the second plate 221, and which is parallel with the second sidewall 221b. The second structure 220 may contain a constituent element such as an antenna in a space which does not overlap the multi-bar 263. The second structure 220 may include a second rear plate 280 which covers at least a part of the third surface 212c of the display 212.

The second rear plate 280 may include a material which does not transmit light when there is no need to display information on the third surface 212c of the display 212. As another example, the second rear plate 280 may be made of a material which transmits light such that information displayed on the third surface 212c is visible from the outside even when the display 212 is partially contained in the second structure 220. The second rear plate 280 may be formed integrally with the second structure 220.

The first support member 240 may be arranged between the printed circuit board 230 and the first rear plate 250.

The printed circuit board 230 may have a processor, a memory, and/or an interface mounted thereon. The processor may include, for example, at least one of a central processing device, an application processor, a graphic processing device, an image signal processor, a sensor hub processor, or a communication processor. When the display 212 is expanded or contracted, the first structure 210 may move while being guided by the first hinge plate 261.

The memory may include, for example, a volatile memory or a nonvolatile memory.

The interface may include, for example, a high definition multimedia interface (HDMI), a universal serial bus (USB) interface, a secure digital (SD) card interface, and/or an audio interface. For example, the interface may connect the electronic device 200 with an external electronic device electrically or physically, and may include a USB connector, an SD card/MMC connector, or an audio connector.

Figures 3, 4:
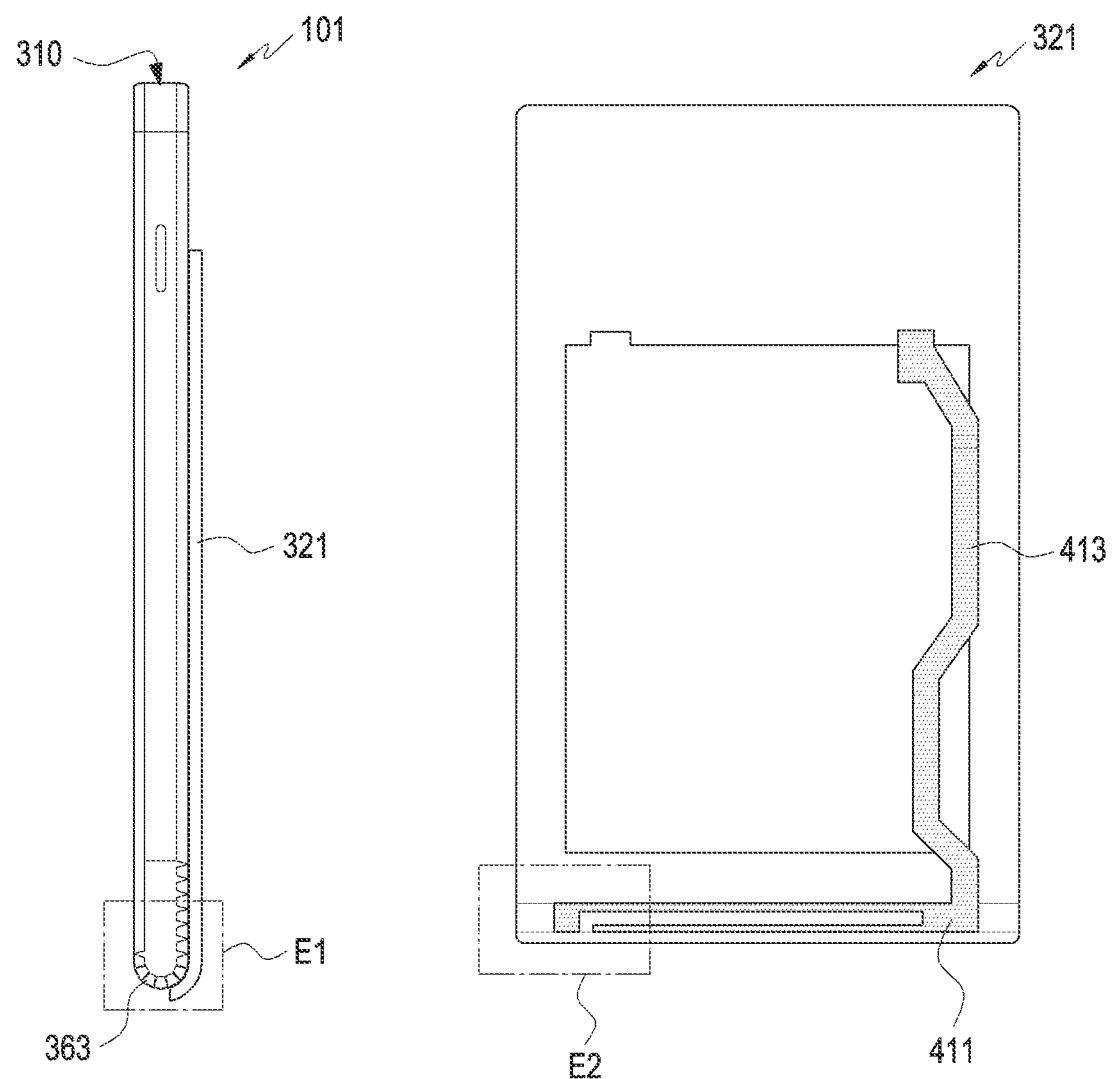
FIG. 3 is a partially-broken side view of an electronic device according to various embodiments.
FIG. 4 is a top view of the inner surface of a second plate of an electronic device according to various embodiments.

FIG. 3 is a side view of an electronic device 300 according to an embodiment of the disclosure.

FIG. 4 is a top view of a part of the inner surface of the second plate 321 of the electronic device according to an embodiment of the disclosure.

It is to be noted that, in the following description of the embodiment with reference to FIG. 3 and FIG. 4, illustration of a sidewall of the second structure (for example, the second sidewall 121*b* or the third sidewall 121*c* of the second structure 120 in FIG. 1A) is omitted.

Referring to FIG. 3 and FIG. 4, the electronic device 300 (for example, the electronic device 100 or 200 of FIG. 1A or FIG. 2) may include a first structure 310 (for example, the first structure 210 of FIG. 2), a multi-bar 363 (for example, the multi-bar 363 of FIG. 2) connected to the first structure 310, or a second plate 321 (for example, the second plate 221 of FIG. 2) which at least partially surrounds the first structure 310 and the multi-bar 363. In some embodiments, the second plate 321 may have an end configured in a curved shape so as to form at least a part of the first sidewall (for example, the first sidewall 212*a* of FIG. 1A).

According to an embodiment, the multi-bar 363 may extend to or be contained in the space between the second plate 321 (or the first sidewall 221*a* of FIG. 2) and the first structure 310 together with the display (for example, the display 212 of FIG. 2 or the flexible touchscreen display layer). For example, at least in the closed state illustrated in FIG. 1A, the multi-bar 363 or a partial area of the display supported by the multi-bar 363 (for example, the bendable portion of the display 112 of FIG. 1A) may extend to the space between the second plate 321 (or the first sidewall 221*a* of FIG. 2) and the first structure 310.

According to various embodiments, there may be provided, on the inner surface of the second plate 321, a conductive pattern 411 and a wire 413 (for example, a flexible printed circuit board) connecting the conductive pattern 411 with the printed circuit board 230. In an embodiment, the conductive pattern 411 may function as an antenna of the electronic device 300. In some embodiments, the conductive pattern 411 may face at least a part of a surface (for example, inner surface) of the second plate 321, for example, a trough provided by the second structure 120 or 220 of FIG. 1 or FIG. 2 (for example, the trough 220*a* of FIG. 2). A capacitive element may be arranged on the surface of the second plate 321, or a dielectric protrusion (for example, "511" in FIG. 5 or FIG. 6) or a metallic protrusion may be formed thereon.

Figure 5:
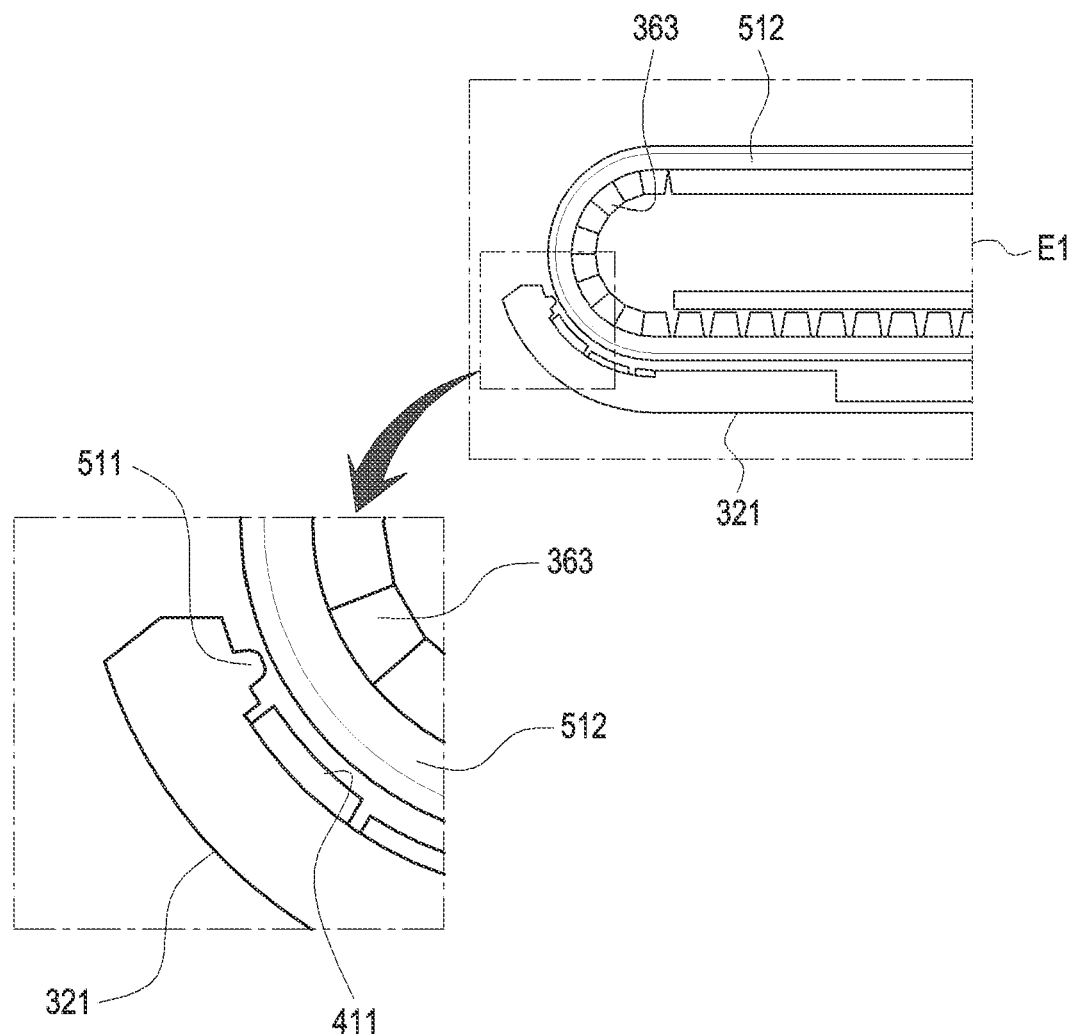
FIG. 5 is a magnified sectional view of part "E1" of FIG. 3 according to an embodiment of the disclosure.
Figure 6:
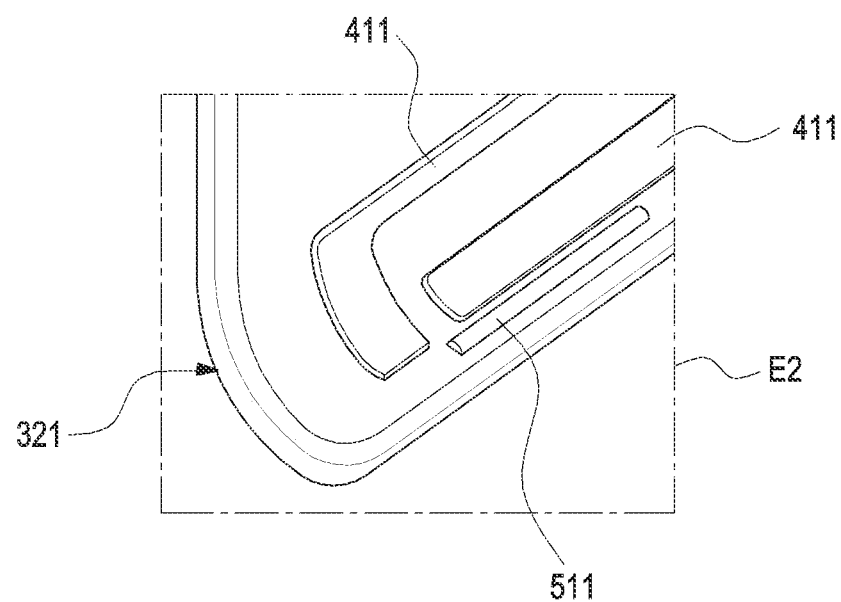
FIG. 6 is a magnified perspective view of part "E2" of FIG. 4 according to an embodiment of the disclosure.

The dielectric protrusion 511 will be described in more detail with reference to FIG. 5 and FIG. 6. FIG. 5 is a magnified sectional view of part "E1" of FIG. 3. FIG. 6 is a magnified perspective view of part "E2" of FIG. 4.

FIG. 5 is a magnified sectional view of part "E1" of FIG. 3 according to an embodiment of the disclosure.

FIG. 6 is a magnified perspective view of part "E2" of FIG. 4 according to an embodiment of the disclosure.

Referring to FIG. 5 and FIG. 6 additionally, the dielectric protrusion 511 may be substantially formed on a surface (for example, inner surface) of an end of the second plate 321. In some embodiments, the dielectric protrusion 511 may keep facing a part of the display 512 (for example, the third surface 212*c* of the display in FIG. 2) inside the second structure (for example, the second structure 220 of FIG. 2). For example, the dielectric protrusion 511 may keep facing a part of the display 512 inside the second structure regardless of whether the electronic device 300 (for example, the electronic device 101 of FIG. 1A) is in a closed state or in an open state. According to an embodiment, when the dielectric protrusion 511 generates a touch input (or hovering input) on the display 512 or the flexible touchscreen display layer (for example, the display 212 of FIG. 2), the electronic device 300 (or the processor of the electronic device 300) may sense a screen size change in real time by sensing a change in the touch coordinate input to the touch panel of the display 512. For example, when the dielectric protrusion 511 generates a touch input or a hovering input on the display 512 or the flexible touchscreen display layer (for example, the display 212 of FIG. 2), the electronic device 300 may detect the position or coordinate in which the touch input or hovering input has occurred.

For example, a movement of the first structure 310 may change the relative position of the dielectric protrusion 511 with regard to the display 512, and the electronic device 300 or the processor may detect the position (or position change) of the dielectric protrusion 511 by using the touchscreen function of the display 512 (or by using an additional sensing device). The electronic device 300 or the processor may calculate the area of the exposed display from the detected position or coordinate of the dielectric protrusion 511.

Figure 7:
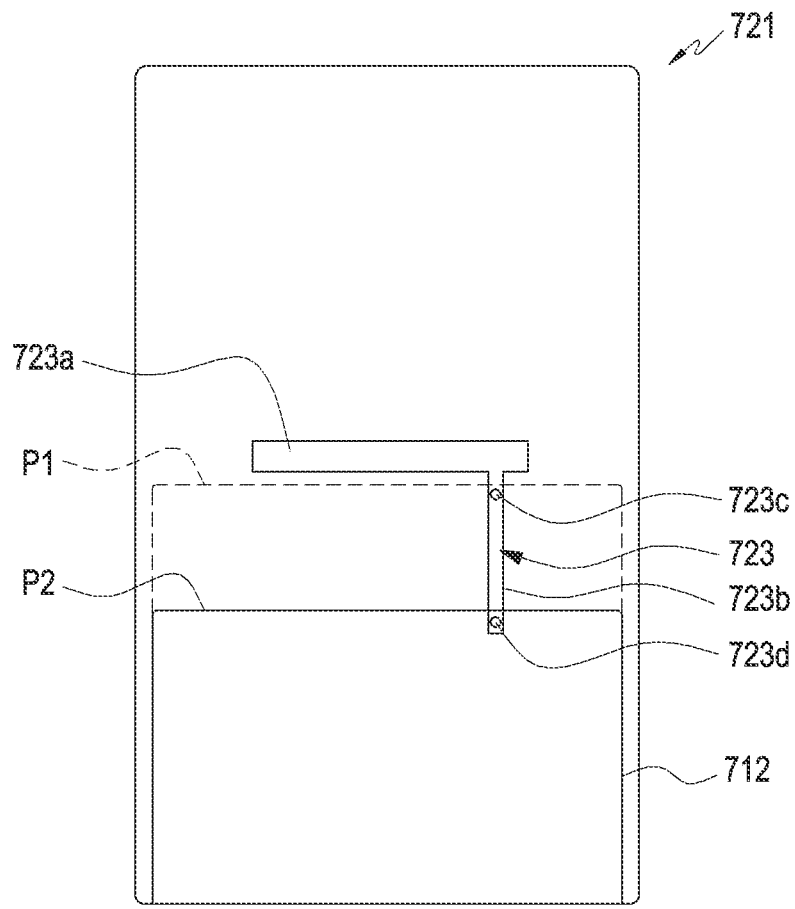
FIG. 7 is a top view of another example of the second plate of an electronic device according to an embodiment of the disclosure.

FIG. 7 is a top view of another example of the second plate 721 of an electronic device 101 according to an embodiment of the disclosure.

Figure 8:
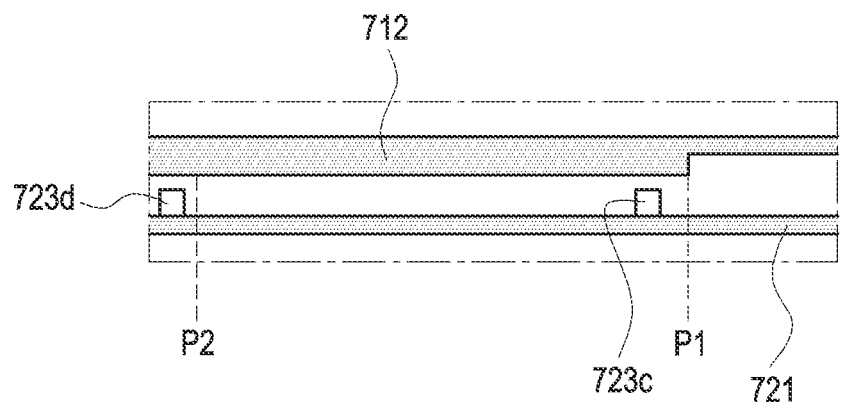
FIG. 8 is a diagram illustrating an operation of an electronic device according to an embodiment of the disclosure.

FIG. 8 is a diagram illustrating an operation of an electronic device 101 according to an embodiment of the disclosure.

Referring to FIG. 7 and FIG. 8, the second plate 721 may include a conductive plate 723 provided on the inner surface thereof, and the conductive plate 723 may include at least one of a ground portion 723*a*, an extension portion 723*b* extending from the ground portion 723*a*, and protrusion portions 723*c* and 723*d* formed on the extension portion 723*b*. The protrusion portions 723*c* and 723*d* may, for example, provide a function similar to that of the dielectric protrusion 511 of FIG. 5. For example, the position (or coordinate) of the protrusion portions 723*c* and 723*d* may be detected through the touchscreen function of the display.

According to various embodiments, the conductive plate 723 may include at least one of a first protrusion portion 723*c* or a second protrusion portion 723*d*. In an embodiment, when the electronic device (for example, the electronic device 101 of FIG. 1A) is in the closed state (for example, when an end of the display 712 is positioned at the point indicated by "P1"), the first protrusion portion 723c may be positioned to face a part of the display 712, and the second protrusion portion 723d may be positioned to face another part of the display 712. The electronic device or the processor of the electronic device may detect the position (or coordinate) of the first protrusion portion 723c or the second protrusion portion 723d by using the touchscreen function of the display 712, and may determine that the electronic device is in the closed state on the basis of the detected position.

According to various embodiments, if the electronic device or the first structure (for example, the first structure 110 of FIG. 1A) gradually moves to the open state, the display 712 may move to a position away from the first protrusion portion 723c. According to an embodiment, when the electronic device or the first structure has moved out of the closed state, the display 712 may detect the position of the second protrusion portion 723d through the touchscreen function, but the position of the first protrusion portion 723c may not be detected. For example, when the electronic device or the first structure has moved out of the closed state or has reached the open state (for example, when an end of the display 712 is positioned at the point indicated by "P2"), the electronic device or the processor of the electronic device may detect the position (or coordinate) of the second protrusion portion 723d by using the touchscreen function of the display 712, and may calculate the exposed area of the display on the basis of the detected position or coordinate of the second protrusion portion 723d.

Figure 9:
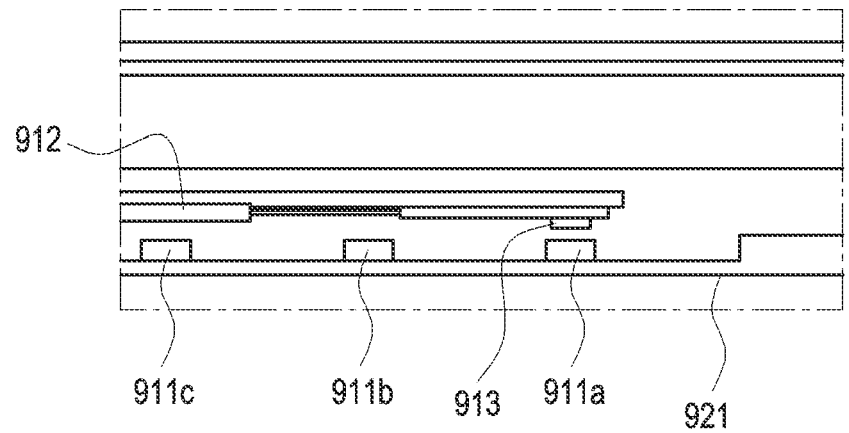
FIG. 9 is a diagram illustrating another operation of an electronic device according to an embodiment of the disclosure.

FIG. 9 is a diagram illustrating another operation of an electronic device according to an embodiment of the disclosure.

Figure 10:
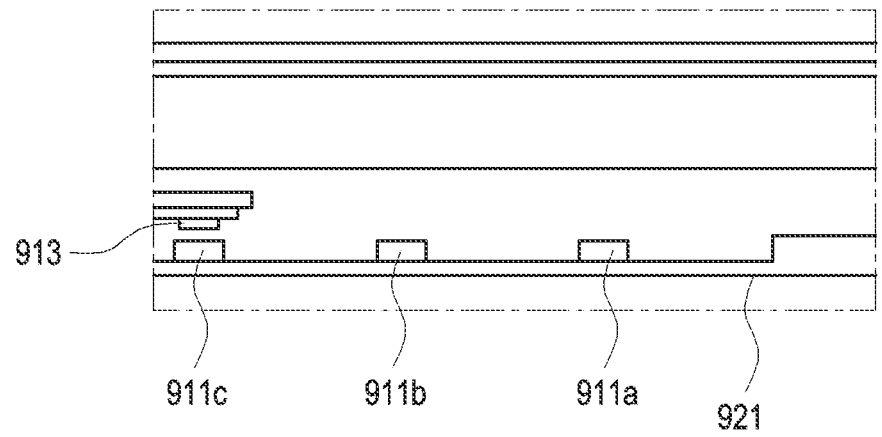
FIG. 10 is a diagram illustrating another operation of an electronic device according to an embodiment of the disclosure.

FIG. 10 is a diagram illustrating another operation of an electronic device according to an embodiment of the disclosure.

Figure 11:
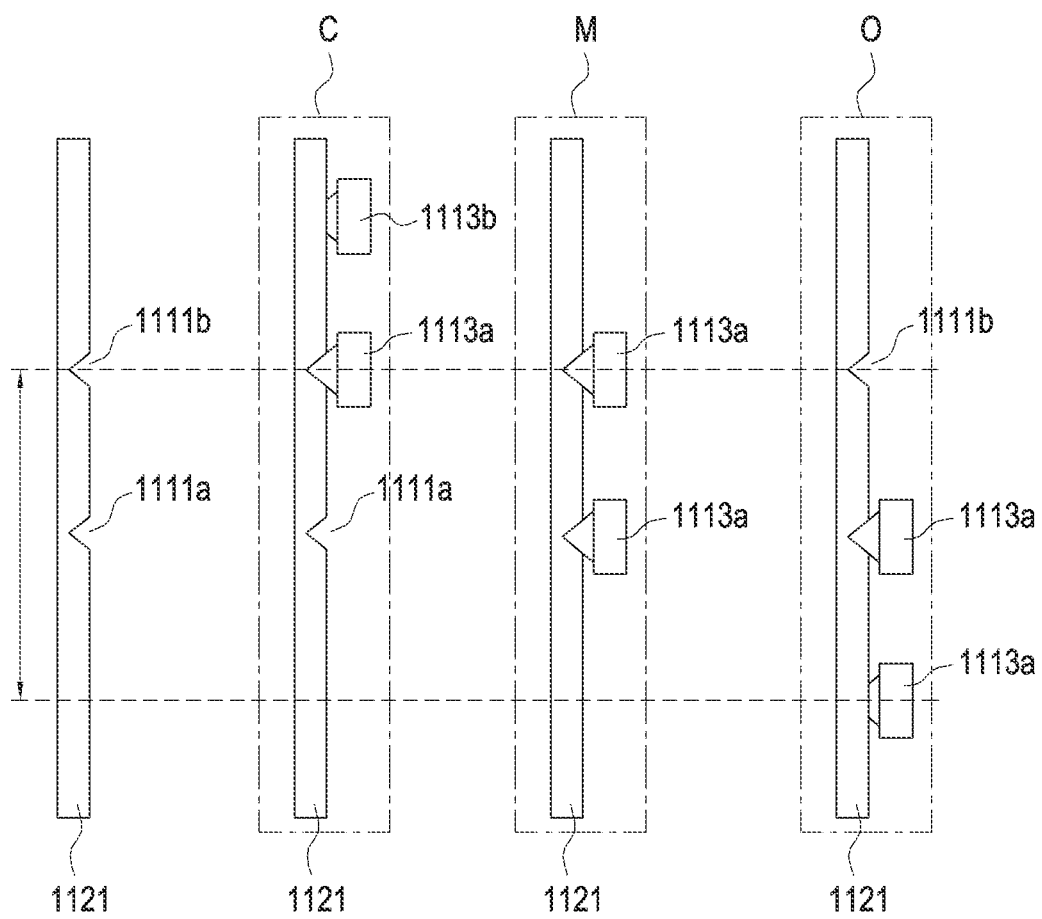
FIG. 11 is a diagram illustrating still another operation of an electronic device according to an embodiment of the disclosure.

FIG. 11 is a diagram illustrating still another operation of an electronic device according to an embodiment of the disclosure.

The operations illustrated in FIG. 9 to FIG. 11 may include an operation of detecting the closed state or open state of the first structure (for example, the first structure 210 of FIG. 2), for example, the display 912 (for example, the display 212 of FIG. 2) by using a detection element and a detection target. The detection element may include, for example, a hall sensor (for example, the hall sensors 911a, 911b, and 911c of FIG. 9 or FIG. 10), a mechanically operating switch element (for example, the switch elements 1113a and 1113b of FIG. 11), or a photodetector, and the detection target may vary depending on the kind of the detection element. For example, when a hall sensor is used as the detection element, the detection target may include a magnet (for example, the magnet 913 of FIG. 9). As another example, when a mechanical switch element is used as the detection element, the detection target may include a recess or a protrusion (for example, the recesses 111a and 111b of FIG. 11) which can engage with or interfere with the switch element. As another example, when a photodetector is used as the detection element, the detection target may include an optical pattern. If such a detection element is mounted on the first structure or the display (for example, the first structure 110 or the display 112 in FIG. 1A), the detection target may be mounted (or formed) on the second structure (for example, the second structure 120 of FIG. 1A). In some embodiments, the detection element may be mounted the second structure, and the detection target may be mounted on the first structure.

Referring to FIG. 9 and FIG. 10, at least one of the hall sensors 911a, 911b, and 911c may be mounted as a detection element on the second plate 921 (for example, the second plate 221 or the second structure 220 in FIG. 2), and at least one magnet 913 may be mounted on as a detection target on the display 912 (or the first plate 211 of FIG. 2). According to an embodiment, the three hall sensors 911a, 911b, and 911c may be mounted on the second plate 921, and the one magnet 913 may be mounted on a structure connected to the display 912. For example, if the first structure (for example, the first structure 110 of FIG. 1A) or the display 912 moves, the magnet may move so as to correspond thereto.

According to various embodiments, when the electronic device is in the closed state (for example, the state illustrated in FIG. 1A), the magnet 913 may be positioned to face the first hall sensor 911a. For example, if the first hall sensor 911a senses the magnet 913, the electronic device (or the processor) may confirm the closed state. When the electronic device is opened or when the electronic device has reached the open state (for example, the state illustrated in FIG. 1B), the magnet 913 may be positioned to face the second hall sensor 911b or the third hall sensor 911c. For example, if the second hall sensor 911b or the third hall sensor 911c senses the magnet 913, the electronic device (or the processor) may confirm an at least partially open state.

Referring to FIG. 11, at least one of switch elements 1113a and 1113b operating in a push type may be mounted as a detection element on the first structure (for example, the first structure 110 of FIG. 1A) or on the display (for example, the display 112 of FIG. 1), and at least one of grooves 1111a and 1111b may be formed as a detection target on the second plate 1121 (for example, the second plate 221 of FIG. 2). According to an embodiment, the two switch elements 1113a and 1113b may be mounted on the first structure, and the two grooves 1111a and 1111b may be formed on the second structure or the second plate 1121. As the first structure (for example, the first structure 110 of FIG. 1A) moves, the switch elements 1113a and 1113b may engage with one of the grooves 1111a and 1111b and be turned on/off. For example, in the closed state (C), only the first switch element 1113a among the switch elements may be turned off and, in the open state (O), only the second switch element 1113b may be turned off. In some embodiments, when the first switch element 1113a and the second switch element 1113b are both in a turned-on state or in a turned-off state, the first structure may be in a middle state (M) between the closed state (C) and the open state (O). For example, the electronic device or the processor may at least detect the closed state or open state of the electronic device on the basis of the on/off state of the switch elements 1113a and 1113b.

According to various embodiments, the number and position of arrangement of the detection elements (or detection targets) described above may be diversified. For example, when a larger number of switch elements and detection targets (recesses or protrusions) corresponding to the switch elements are arranged, the exposed area of the display may be detected in a stepwise manner. It is also possible to detect the exposed area of display in a stepwise manner when a larger number of hall sensors are used as detection elements. For example, the combination of detection elements and detection targets or the number of detection elements (or detection targets) may be variously selected in view of the environment in which the electronic device (for example, the electronic device 101 of FIG. 1A) is used, the range of movement of the first structure (for example, the first structure 110 of FIG. 1), the detected position thereof, or utilization of the coordinate thereof.

Figure 12:
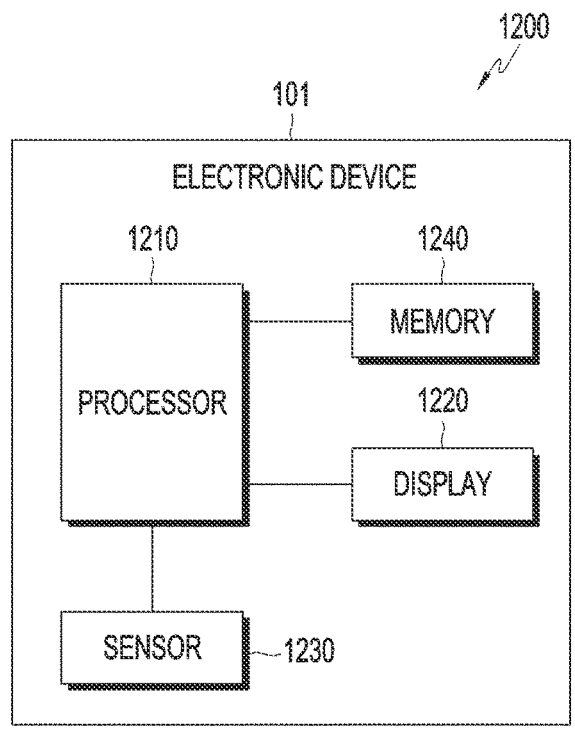
FIG. 12 is a block diagram illustrating an electronic device according to an embodiment of the disclosure.

FIG. 12 is a block diagram 1200 illustrating an electronic device according to an embodiment of the disclosure.

Referring to FIG. 12, the electronic device 101 according to various embodiments may include a processor 1210, a display 1220 (for example, the display 112), a sensor 1230 (for example, the sensors 911*a*, 911*b*, and 911*c*), a memory 1240, and/or structures containing the same. The structures may include a second structure which forms at least a partial area of the lower portion of the electronic device 101 and at least a partial area of the side portion thereof, and a first structure coupled so as to move (for example, slide or roll) with regard to the second structure such that at least a part of the first structure overlaps the second structure. The display 1220 may include a flexible display, at least a part of which is mounted on the first structure, and which includes a bendable portion.

According to various embodiments, when at least one structure (for example, the first structure) among the first structure and the second structure is moved (for example, slid-out, rolled-out, slid-in, or rolled-in) with regard to the other structure (for example, the second structure) in a first direction (for example, longitudinal direction), the size of the display area visually exposed to the outside of the electronic device 101, among the areas of the display 1220 mounted on the at least one moved housing (for example, the first structure), may be changed (for example, expanded or contracted). According to an embodiment, when the visually exposed display area is contracted, at least a partial area of the bendable portion may be moved (for example, slid-in or rolled-in) to a space formed by the second structure and contained therein. When the visually exposed display area is expanded, the at least partial area of the bendable portion contained in the space formed by the second structure may be moved (for example, slid-out or rolled-out) from the second structure and visually exposed to the outside. At least a part of the display area visually exposed to the outside may be retracted so as to be at least partially contained by the second structure when, for example, the first structure is moved (for example, slid-in or rolled-in). According to an embodiment, the size of the display area of the display 1220 may be changed, for example, in response to the user's direct touch input to the second structure, which is at least partially connected to the display 1220, or to an input to another feature (for example, the home button or another dedicated button) (not illustrated) arranged on the electronic device 101.

The memory 1240 may store instructions which, when executed, control the processor 1210 so as to perform various operations. For example, the processor 1210 may perform an operation of displaying at least one first object in the first area of the planar portion and displaying at least one second object in the second area of the planar portion in the closed state, and an operation of displaying the at least one first object in the first area and displaying the at least one second object in the third area of the bendable portion in the open state.

According to various embodiments, it may be determined that, when the first structure and the second structure are slide-moving with regard to each other, the size of the screen exposed in the first direction with regard to the first surface of the display 1220 is changed. The processor 1210 may determine that the screen size is changed, and may conduct a control such that designated image processing is performed with regard to the screen area which is exposed to the front surface in response to the screen size change.

According to various embodiments, the designated image processing may be performed by an image signal processor (ISP) included in the processor 1210, or may be performed by an ISP formed as a separate device from the processor 1210.

Figure 13:
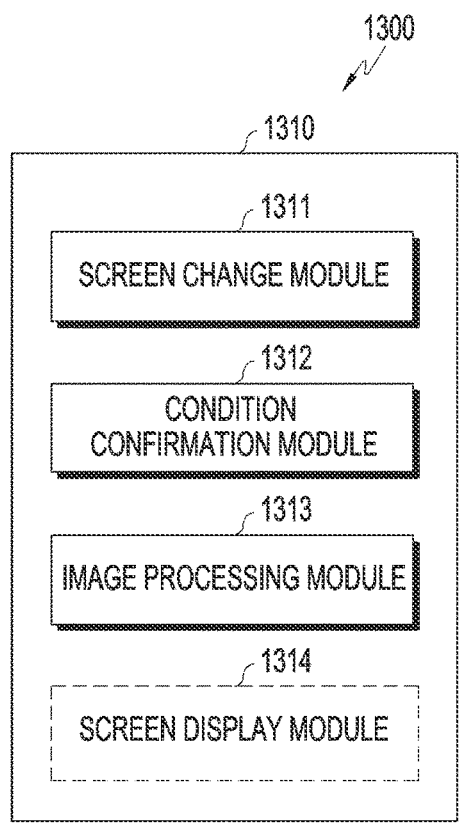
FIG. 13 is a block diagram illustrating a flexible display control module of an electronic device according to an embodiment of the disclosure.

FIG. 13 is a block diagram illustrating a flexible display control module of an electronic device according to various embodiments. FIG. 13 is a block diagram 1300 illustrating a flexible display control module 1310 corresponding to control operations corresponding instructions which are stored in the memory 1240 and executed by the processor 1210, for example, according to various embodiments. According to FIG. 13, the flexible display control module 1310 may include a screen change module 1311, a condition confirmation module 1312, and/or an image processing module 1313. According to an embodiment, the flexible display control module 1310 may further include a screen display module 1314 (for sub-modules corresponding to remaining control operations).

According to various embodiments, if the sensor 1230 senses a screen change in response to a movement of the first structure (for example, the first structure 110), the screen change module 1311 may determine whether or not the screen is changed. The condition confirmation module 1312 may confirm conditions that are set with regard to respective areas or respective objects. For example, the condition confirmation module 1312 may confirm whether a setting has been made so as to apply real-time position compensation to a specific area or a specific object or not to apply the same. The image processing module 1313 may perform a function of processing or rendering the entire image on the basis of the confirmation made by the condition confirmation module 1312 regarding whether or not real-time position compensation is applied to each area or object.

An electronic device 101 according to one of various embodiments may include: a first structure 110 including a first plate 111 including a first surface 111*a* and a second surface 111*b* facing in an opposite direction to the first surface; a second structure 120 including a second plate 121 facing the second surface 111*b* of the first plate 111, a first sidewall 121*a* which is perpendicular to the second plate 121, a second sidewall 121*b* which is perpendicular to the second plate 121 and to the first sidewall 121*a*, and a third sidewall 121*c* which is perpendicular to the first sidewall 121*a* and to the second plate 121, and which is parallel with the second sidewall 121*b*, the second plate, 121 the first sidewall 121*a*, the second sidewall 121*b*, and the third sidewall 121*c* forming a trough, one side of which is open, so as to contain at least a part of the first structure 110, the first structure 110 being able to move between a closed state and an open state with regard to the second structure 120 in a direction which is parallel with the second plate 121 and with the second sidewall 121*b*, the first structure 110 being positioned at a first distance from the first sidewall 121*a* in the closed state and being positioned at a second distance, which is larger than the first distance, from the first sidewall 121*a* in the open state; a flexible touchscreen display layer (for example, the display 112 or 1220) including a planar portion 112*a* which extends across at least a part of the first surface 111*a*, and which is mounted on the first surface, and a bendable portion which extends from the planar portion 112*a* such that, in the closed state, the bendable portion extends to a space between the first sidewall 121*a* and the first structure 110, at least part of the bendable portion being pulled from the space when the first structure 110 is moved from the closed state to the open state such that, when seen from above the first plate 111, the at least part of the bendable portion forms a substantially planar surface between the planar portion 112a and the first sidewall 121a; a processor 1210 operatively connected to the flexible touchscreen display layer; and a memory 1240 operatively connected to the processor 1210. The memory 1240 may store instructions, when executed, configured to enable the processor 1210 to display at least one first object in a first area of the planar portion 112a and to display at least one second object in a second area of the planar portion in the closed state, and to display the at least one first object in the first area and to display the at least one second object in a third area of the bendable portion in the open state.

According to various embodiments, the distance between the second area and the third area may be smaller than the distance between the first area and the third area.

According to various embodiments, the instructions may be configured to enable the processor 1210 not to move the at least one first object in the first area and to move the at least one second object from the second area to the third area while the first structure 110 is moved from the closed state to the open state.

According to various embodiments, the instructions may be configured to enable the processor 1210 to linearly move the at least one second object from the second area to the third area in response to a movement of the first structure 110 with regard to the second structure 120 while the first structure 110 is moved from the closed state to the open state.

According to various embodiments, the instructions may be configured to enable the processor 1210 to display at least one third object in a fourth area on the planar portion 112a of the flexible touchscreen display layer (for example, the display 112 or 1220) in the closed state, and to display the at least one third object in a fifth area on the planar portion 112a of the flexible touchscreen display layer (for example, the display 112 or 1220) in the open state, and the fourth area may be between the first area and the second area.

According to various embodiments, the fifth area may be between the fourth area and the second area.

According to various embodiments, the at least one first object may include at least one of a notification bar, a status indicator, a signal intensity indicator, or a battery capacity indication.

According to various embodiments, the at least one second object may include at least one of a telephone app icon, an email icon, a text message app icon, a contact list app icon, an Internet browser app icon, or an application screen switching icon.

According to various embodiments, the first sidewall 121a may include a surface facing the trough and a capacitive element mounted on the surface.

According to various embodiments, the instructions may be configured to enable the processor 1210 to detect the capacitive element by using the bendable portion of the flexible touchscreen display layer (for example, the display 112 or 1220), and to determine the position of the first structure 110 with regard to the second structure 120 at least partially on the basis of the detected capacitive element.

According to various embodiments, the instructions may be configured to enable the processor 1210 to move the at least one second object on the flexible touchscreen display layer (for example, the display 112 or 1220) at least partially on the basis of a movement of the determined position.

According to various embodiments, the third object may include multiple icons, and the instructions may be configured to enable the processor 1210 to arrange adjacent icons among the multiple icons at a larger interval while the first structure 110 is moved from the closed state to the open state.

According to various embodiments, the third object may include at least one image, and the instructions may be configured to enable the processor 1210 to cut at least a part of the at least one image in proportion to the reduced area of the planar portion 112a while the first structure 110 is moved from the open state to the closed state.

According to various embodiments, the third object may include at least one image, and the instructions are configured to enable the processor 1210 to resize the at least one image so as to maintain an identical horizontal-to-vertical ratio while the first structure 110 is moved from the open state to the closed state.

According to various embodiments, the third object may include a first number of objects, and the instructions may be configured to enable the processor 1210 to arrange a second number of objects, the second number being larger than the first number, while the first structure 110 is moved from the closed state to the open state.

According to various embodiments, the third object may include at least one of an icon, a thumbnail, an image, or a text.

According to various embodiments, the instructions may be configured to enable the processor 1210 to repeatedly move the at least one second object upward/downward or leftward/rightward within a designated time when it is sensed that the first structure 110 has moved and reached a maximum closed state or a maximum open state.

According to various embodiments, the object to which position compensation is to be applied may include at least one of a telephone app icon, an email icon, a text message app icon, a contact list app icon, an Internet browser app icon, or an application screen switching icon.

According to various embodiments, the instructions may be configured to enable the processor to arrange adjacent ions among multiple icons at a larger interval while the first structure moves from the closed state to the open state.

According to various embodiments, the instructions may cause the processor to resize an image, which is displayed on the screen, so as to maintain an identical horizontal-to-vertical ratio while the first structure moves from the open state to the closed state.

According to various embodiments, the instructions may cause the processor to repeatedly move at least one object upward/downward or leftward/rightward within a designated time when it is determined that the first structure has moved and reached a maximum closed state or a maximum open state.

Figure 14:
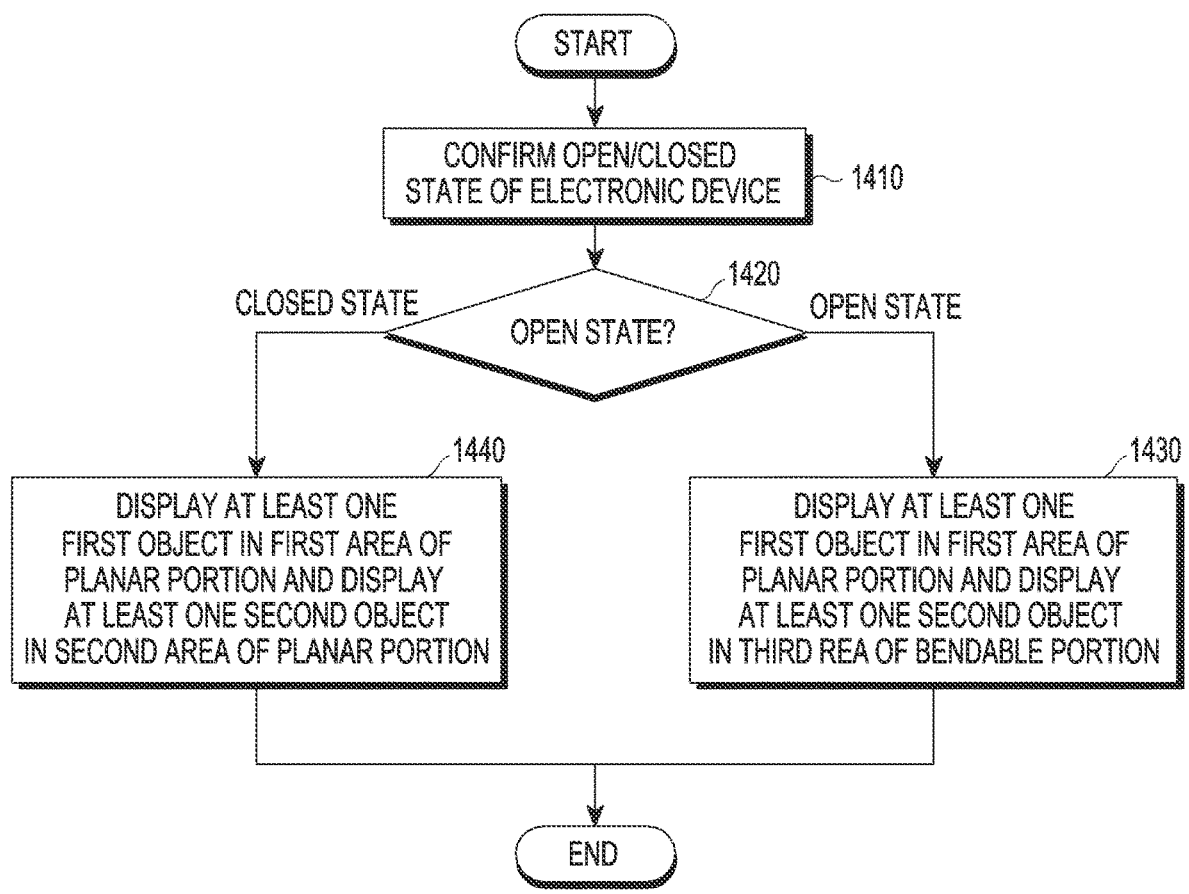
FIG. 14 is a flowchart illustrating an operation of an electronic device, according to whether the display is changed to an open state or to a closed state according to an embodiment of the disclosure.

FIG. 14 is a flowchart illustrating an operation of an electronic device 101 according to various embodiments, according to whether the display is changed to an open state or to a closed state.

Referring to FIG. 14, in operation 1410, the processor 1210 of the electronic device 101 may confirm the open state or closed state of the electronic device. In operation 1420, the processor 1210 may determine whether or not real-time position compensation is applied to each object according to the confirmed state of the electronic device 101, and may display the corresponding object.

According to various embodiments, the processor 1210 may control the display 1220 so as to display at least one first object in the first area of the planar portion of the display 1220 and to display at least one second object in the second area of the planar portion in the closed state in operation 1440. According to various embodiments, the processor

1210 may control the display 1220 so as to display the at least one first object in the first area and to display the at least one second object in the third area of the bendable portion in the open state in operation 1430. The object-displaying operation may be performed by the screen display module 1314.

The processor 1210 of the electronic device 101 or the flexible display control module 1310 of FIG. 13 may sense a change in size of the display (for example, flexible display) of the electronic device by using, for example, at least one sensor (for example, a switch, a hall sensor, a touch sensor, a force sensor, a dielectric body, or a metal). For example, the electronic device may sense a change in size of the display area (for example, the screen area exposed in the first direction) of the front surface (for example, the first surface 111*a*) of the display resulting from a movement of the display (for example, flexible display). According to an embodiment, the operation of sensing the size change may be performed by the screen change module 1311, for example. According to an embodiment, the operation of displaying the changed screen may be performed by the screen display module 1314, for example.

Figure 15:
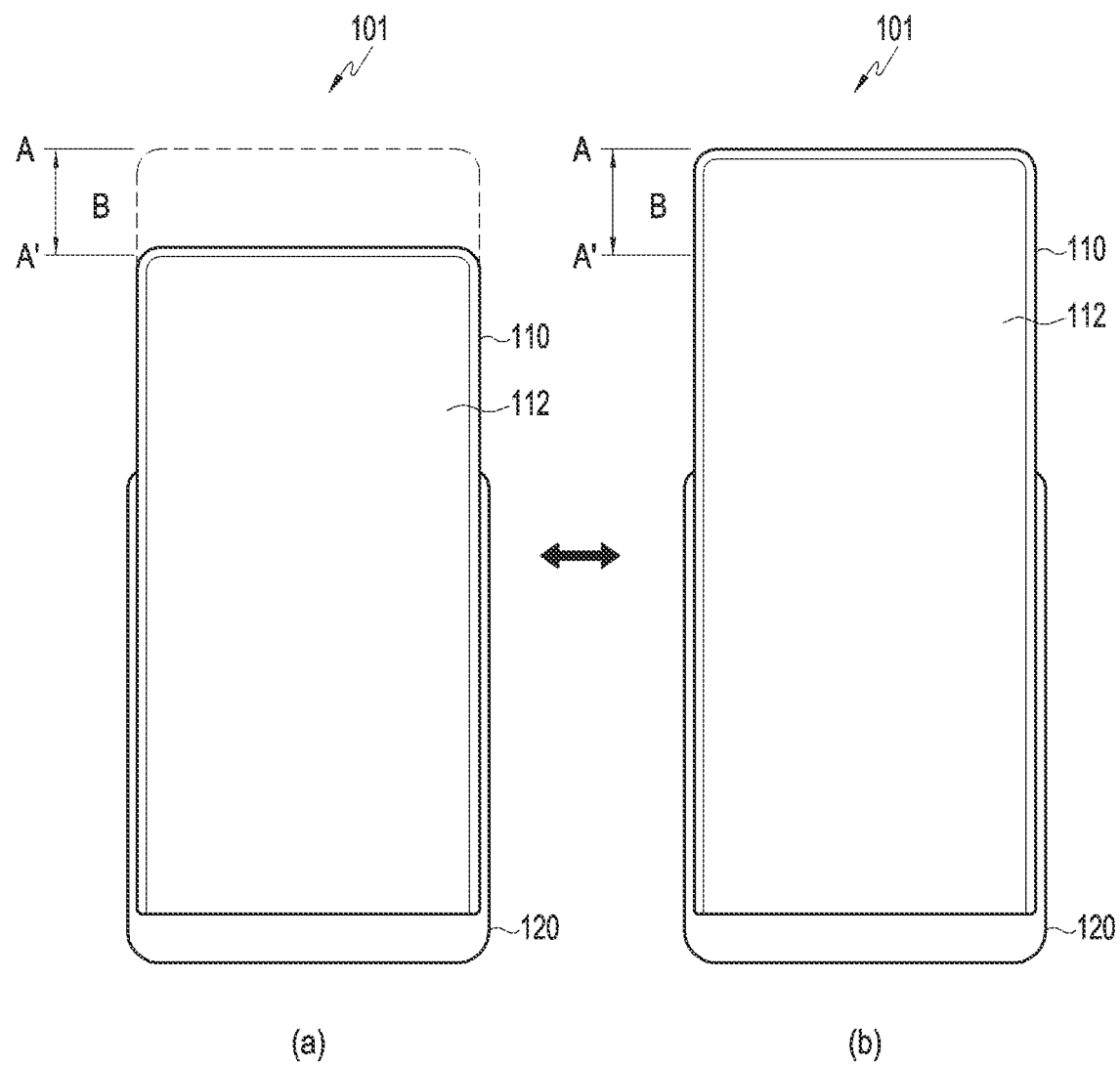
FIG. 15 is a diagram illustrating a closed state and an open state of an electronic device according to an embodiment of the disclosure.

FIG. 15 is a diagram illustrating a closed state (a) and an open state (b) of an electronic device according to an embodiment of the disclosure.

Figure 16:
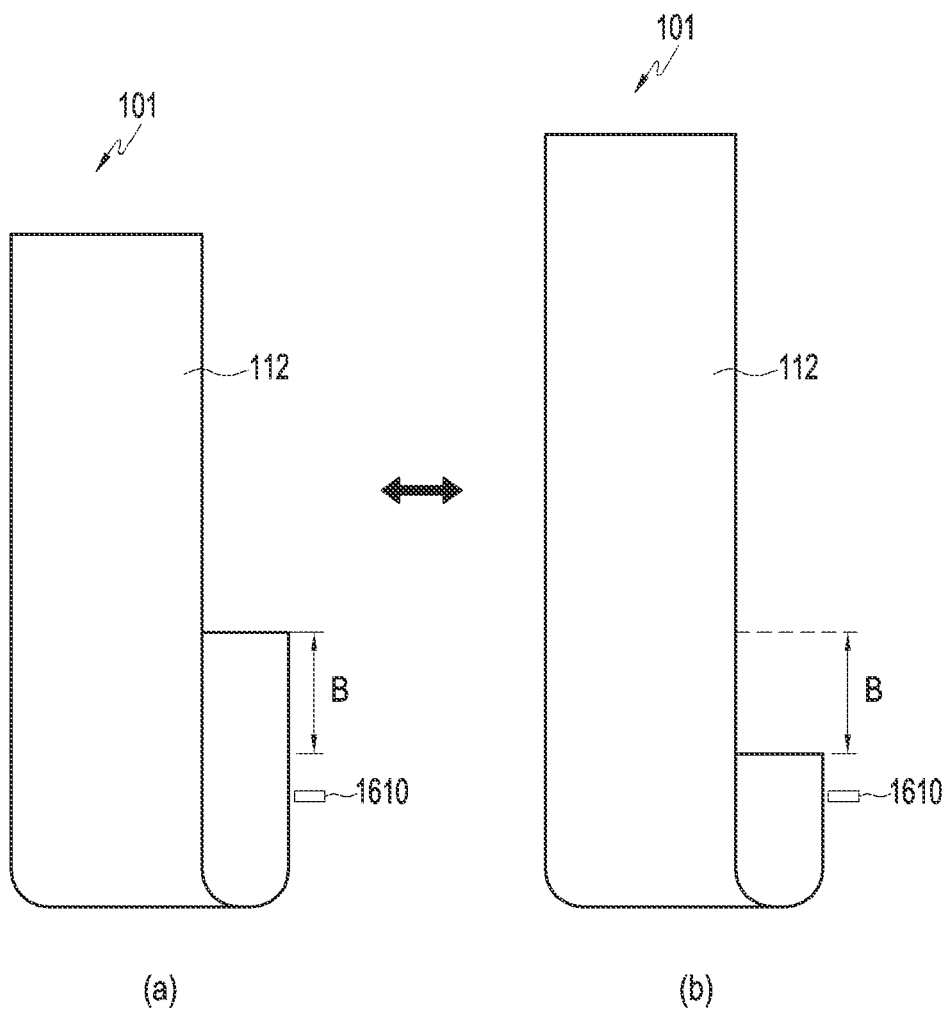
FIG. 16 is a diagram illustrating a closed state and an open state of an electronic device according to an embodiment of the disclosure.

FIG. 16 is a diagram illustrating a closed state (a) and an open state (b) of an electronic device according to an embodiment of the disclosure.

Referring to FIG. 15 and FIG. 16, the left side indicates the electronic device 101 in a closed state, and the right side indicates the electronic device 101 in an open state. The first structure 110 of the electronic device 101 can move between the closed state (a) and the open state (b) with regard to the second structure 120 in a first direction which is parallel with the second plate and with the second sidewall 121*b*, and may be positioned at a first distance from the first sidewall in the closed state and positioned at a second distance from the first sidewall, which is larger than the first distance, in the open state. The vertical length of the electronic device 101 in the open state (b) on the right side may be larger than that in the closed state (a) on the left side.

According to various embodiments, in the case of a rollable device having a display 112, at least a part of which is rolled in, a sensor 1610 may be arranged thereon so as to enable touch recognition by a touch panel. When the user expands or contracts the display, it is possible to recognize a change in the touch input coordinate in real time through the sensor 1610 and to calculate the degree of increase or decrease of the display screen size. For example, a pixel value B on the display may be determined, and the screen display module 1314 may change the configuration or layout of the screen on the basis of information collected through the sensor 1610.

Figure 17:
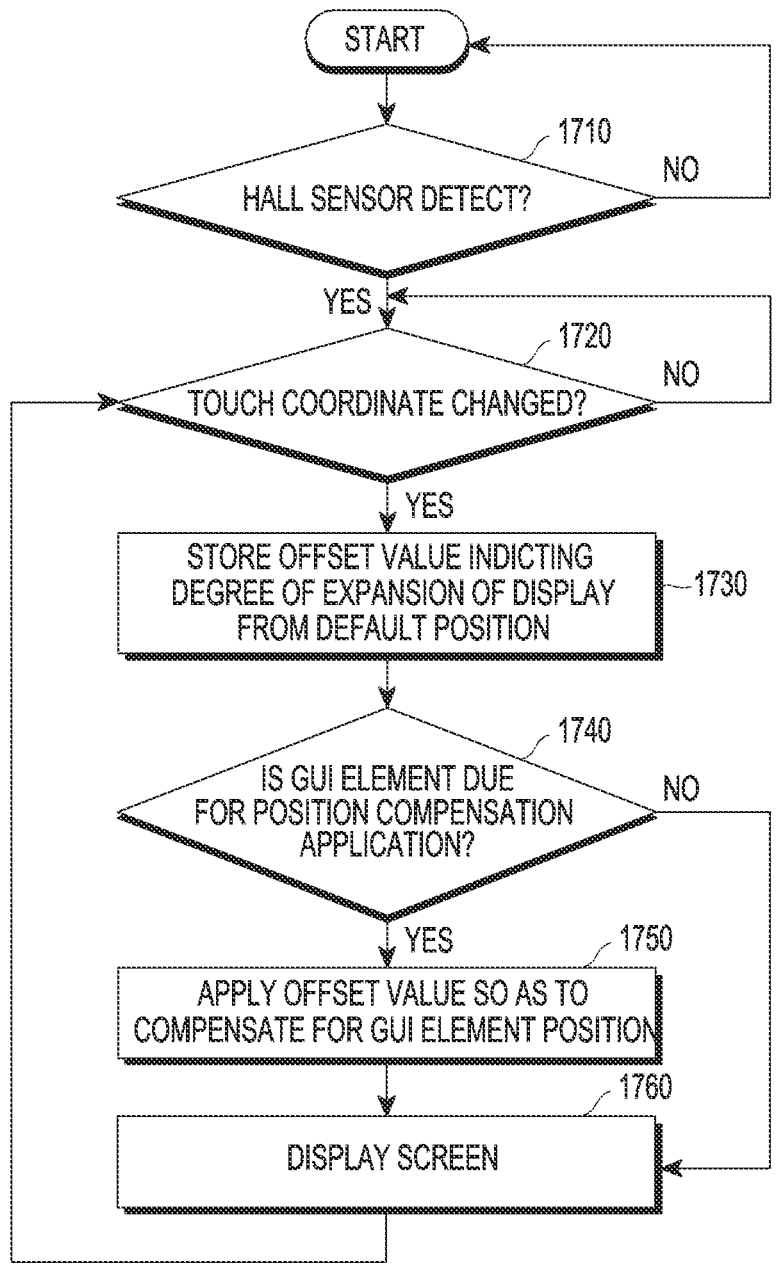
FIG. 17 is a flowchart illustrating an operation of an electronic device, according to whether the display is changed to an open state or to a closed state according to an embodiment of the disclosure.

FIG. 17 is a flowchart illustrating an operation of an electronic device, according to whether the display is changed to an open state or to a closed state according to an embodiment of the disclosure.

Referring to FIG. 17, the processor 1210 may sense a movement of the electronic device, an open state thereof, or a closed state thereof through at least one sensor 1610 arranged on the electronic device 101. For example, when a hall sensor 911*a*, 911*b*, or 911*c* is sensed at operation 1710, the processor 1210 may determine whether or not the touch coordinate is changed at operation 1720.

When it is determined that the touch coordinate is changed, the processor 1210 may store an offset value which indicates the degree of expansion of the display from the default position at operation 1730.

At operation 1740, the processor 1210 determines whether or not each object constituting the screen is a graphical user interface (GUI) element to which position compensation is to be applied. Upon confirming a GUI element to which position compensation is to be applied, the processor 1210 may apply the stored offset value so as to compensate for the position of the GUI element at operation 1750. Then, the processor 1210 may control the screen display at operation 1760.

Figure 18:
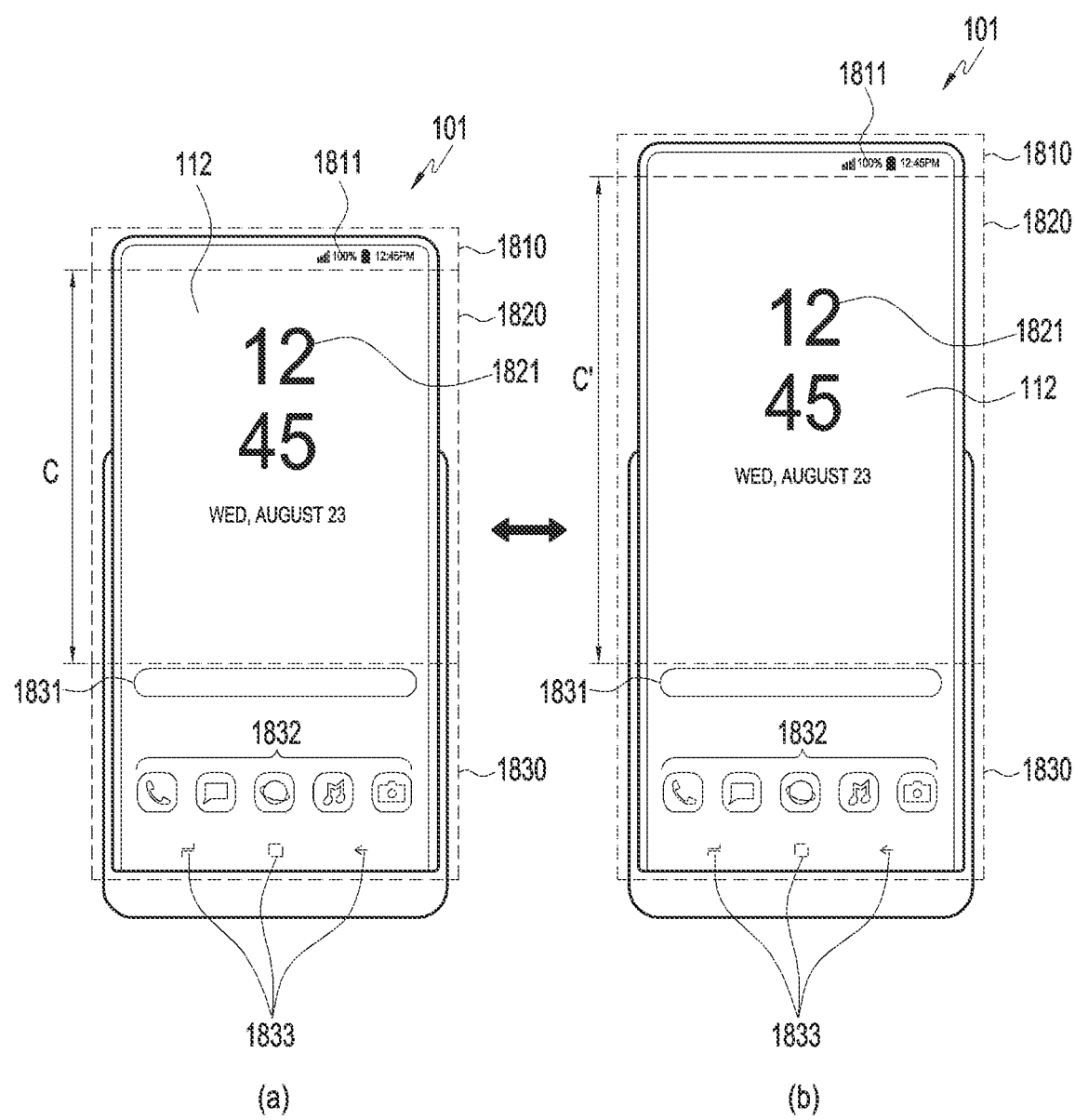
FIG. 18 is a diagram illustrating a screen of an electronic device according to various embodiments, which is displayed according to whether the display is changed to an open state or to a closed state according to an embodiment of the disclosure.

FIG. 18 is a diagram illustrating a screen of an electronic device, which is displayed according to whether the display is changed to an open state (b) or to a closed state (a) according to an embodiment of the disclosure.

Referring to FIG. 18, the electronic device 101 may display a screen (for example, home screen) in the open state (b) or in the closed state (a).

The screen of the electronic device 101 may include a first object display area 1810, a second object display area 1830, or a third object display area 1820 in the closed state (a) on the left side.

The first object display area 1810 may include at least one object 1811, and the first object may include at least one of a notification bar, a status indicator, a signal intensity indicator, or a battery capacity indication. The second object display area 1830 may include at least one second object. The second object may include, for example, a search window 1831 and icons 1832 or soft keys 1833 including a telephone app icon, an email icon, a text message app icon, a contact list app icon, an Internet browser app icon, or an application screen switching icon. The third object display area 1820 may include at least one third object 1821. The third object 1821 may include, for example, objects designated on the screen, such as time or date.

According to an embodiment, if the screen of the electronic device 101 is changed from the closed state (a) on the left side to the open state (b) on the right side, the screen may include a first object display area 1810, a second object display area 1830, and a third object display area 1820, and the third object display area 1820 may be displayed with a vertical length, which is increased from C to C' in proportion to the size increase of the screen.

According to an embodiment, the first object display area 1810 in FIG. 18 may be an area to which real-time position compensation is not applied such that, even if the display of the electronic device 101 is expanded or contracted, the same is displayed according to the physical position of the display. For example, the first object 1811 in the first object display area 1810 may be displayed in the same physical position (on the upper end of the display) either in the closed state or in the open state, as illustrated.

According to an embodiment, the second object display area 1830 may be an area to which real-time position compensation is applied such that, even if the physical position of the display is changed by expansion or contraction of the display of the electronic device 101, the same is rendered after compensating for the coordinate value in proportion to the change, thereby providing the user with a visual experience which makes the user feel as if there is no position change. For example, the search window 1831, the icons 1832, or the soft keys 1833 in the second object display window 1830 may be displayed, even if the physical position of the display is changed, after position compensation so as to provide a visual effect which makes the same appear in fixed positions.

According to an embodiment, the third object display area 1820 may be an area which is increased in proportion to the size increase of the screen such that, when the size of the screen increases, the display position of the third object 1821 is adjusted so as to align and position the third object 1821 at the center in the third object display area 1820.

Figure 19:
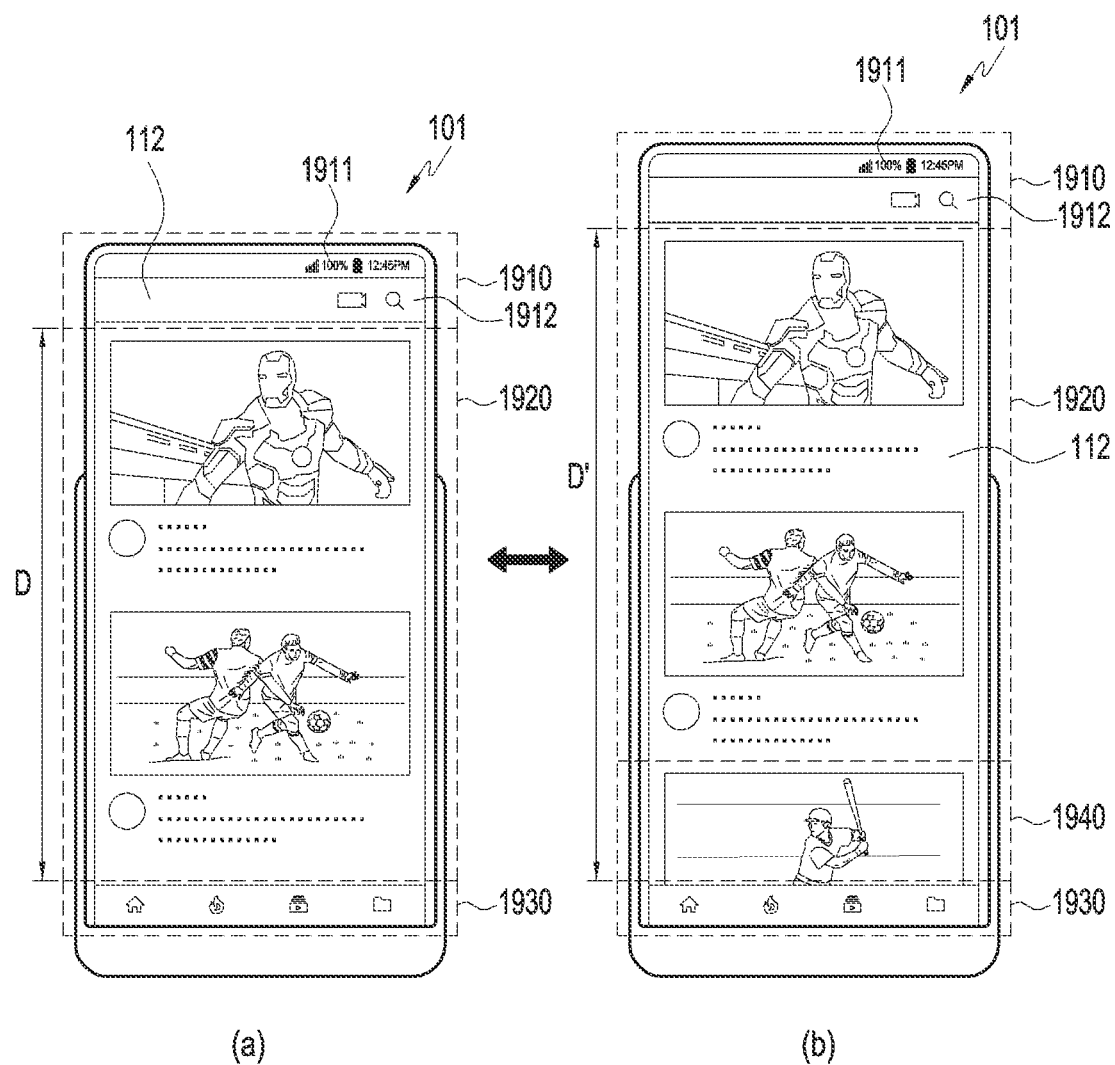
FIG. 19 is a diagram illustrating a screen of an electronic device, which is displayed according to whether the display is changed to an open state or to a closed state according to an embodiment of the disclosure.

FIG. 19 is a diagram illustrating a screen of an electronic device, which is displayed according to whether the display is changed to an open state (b) or to a closed state (a) according to an embodiment of the disclosure.

Referring to FIG. 19, the electronic device 101 may display a moving image list (for example, a YouTube' execution screen) in the open state (b) or in the closed state (a).

According to an embodiment, the moving image list display screen of the electronic device 101 may include a first object display area 1910, a second object display area 1930, and a third object display area 1920 in the closed state (a) on the left side.

According to an embodiment, the first object display area 1910 may include at least one first object 1911 and 1912. The first object may include, for example, at least one of a notification bar, a status indicator, a signal intensity indicator, or a battery capacity indication. The second object display area 1930 may include at least one second object. The second object may include, for example, at least one icon (for example, low-end menu). Moving image lists may be displayed in the third object display area 1920.

According to an embodiment, if the screen of the electronic device 101 is changed from the closed state on the left side to the open state on the right side, the screen may include a first object display area 1910, a second object display area 1930, and a third object display area 1920, and the third object display area 1920 may be displayed with a vertical length, which is increased from D to D' in proportion to the size increase of the screen.

According to an embodiment, the first object display area 1910 in FIG. 19 may be an area to which real-time position compensation is not applied such that, even if the display of the electronic device 101 is expanded or contracted, the same is displayed according to the physical position of the display. For example, the first object 1911 in the first object display area 1910 may be displayed in the same physical position (on the upper end of the display) either in the closed state (a) or in the open state (b).

According to an embodiment, the second object display area 1930 may be an area to which real-time position compensation is applied such that, even if the physical position of the display is changed by opening or closing the display of the electronic device 101, the same is rendered after compensating for the coordinate value in proportion to the change, thereby providing the user with a visual experience which makes the user feel as if there is no position change. For example, the icons in the second object display window 1930 may be displayed, even if the physical position of the display is changed, after position compensation so as to provide a visual effect which makes the same appear in fixed positions.

According to an embodiment, the third object display area 1920 may be an area 1940 which is increased in proportion to the size increase of the screen. For example, the larger the screen size, the larger the number of moving image lists that may be displayed in the third object display area 1920.

Figure 20:
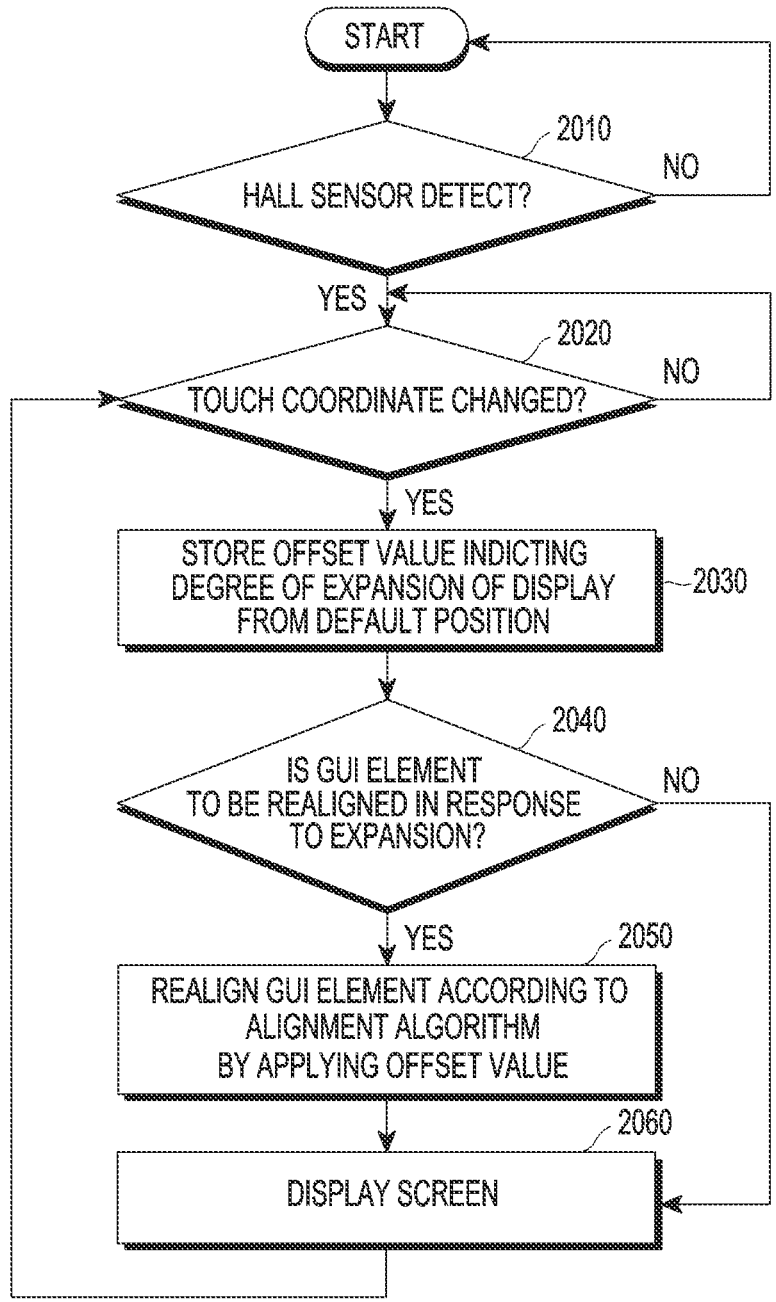
FIG. 20 is a flowchart illustrating an operation of an electronic device, according to whether the display is changed to an open state or to a closed state according to an embodiment of the disclosure.

FIG. 20 is a flowchart illustrating an operation of an electronic device 101, according to whether the display 112 or 1220 is changed to an open state or to a closed state according to an embodiment of the disclosure.

Referring to FIG. 20, the processor 1210 may sense a movement of the electronic device, an open state thereof, or a closed state thereof through at least one sensor 1610 arranged on the electronic device 101. For example, when a hall sensor is sensed at operation 2010, the processor 1210 may determine whether or not the touch coordinate is changed at operation 2020.

When it is determined that the touch coordinate is changed, the processor 1210 may store an offset value which indicates the degree of expansion of the display from the default position at operation 2030.

At operation 2040, the processor 1210 may determine whether or not a GUI element is to be realigned in response to screen expansion. When it is determined that the GUI element is to be realigned, the processor 1210 may realign the GUI element by using the stored offset value at operation 2050, and may display the screen in operation 2060.

Figure 21:
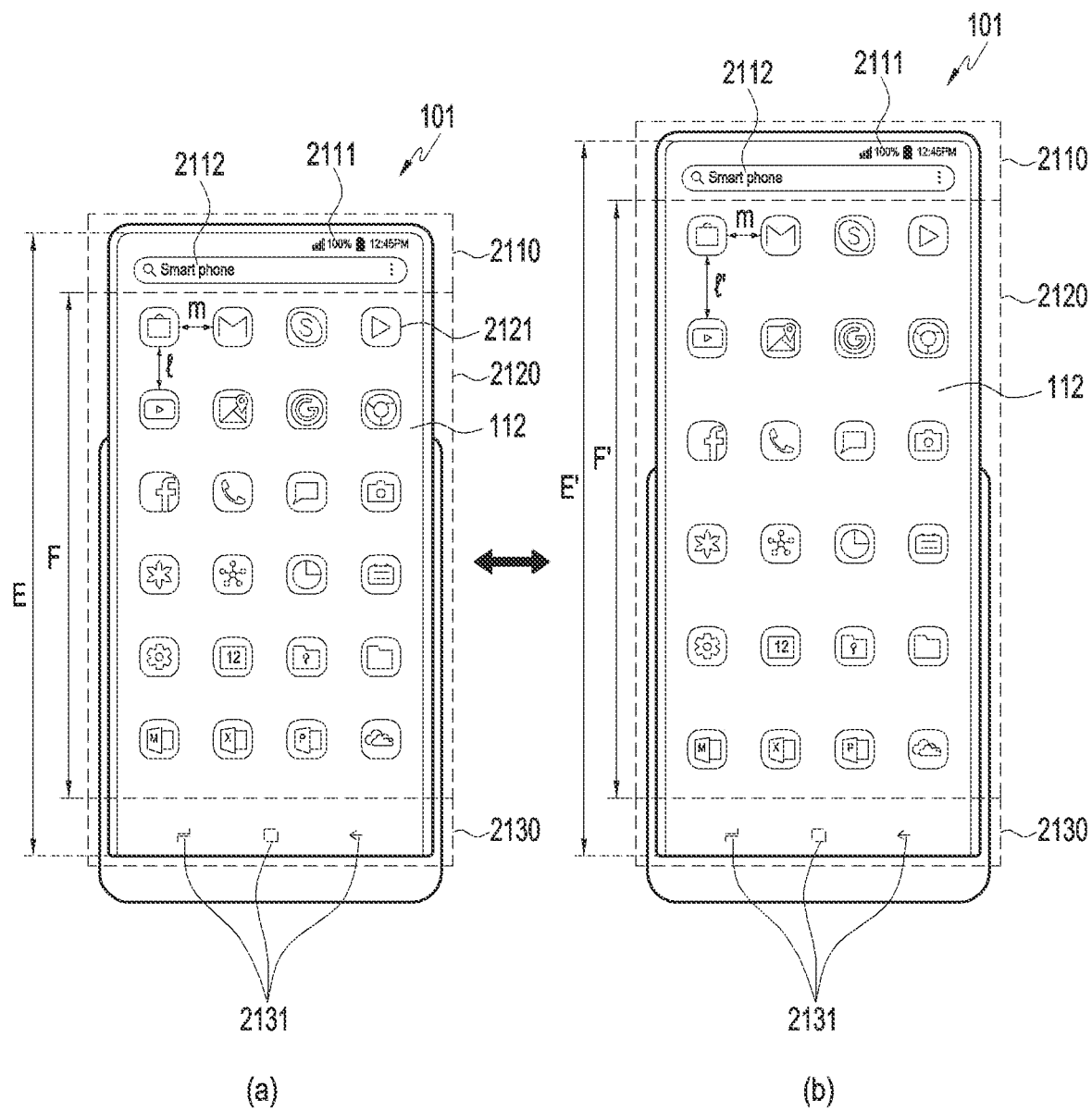
FIG. 21 is a diagram illustrating a screen of an electronic device, which is displayed according to whether the display is changed to an open state or to a closed state according to an embodiment of the disclosure.

FIG. 21 is a diagram illustrating a screen of an electronic device, which is displayed according to whether the display is changed to an open state (b) or to a closed state (a) according to an embodiment of the disclosure.

Referring to FIG. 21, the electronic device 101 may display an app list screen including multiple icons which can be used to execute corresponding applications, respectively, in the open state (b) or in the closed state (a).

According to an embodiment, the app list screen of the electronic device 101 may include a first object display area 2110, a second object display area 2130, or a third object display area 2120 in the closed state (a) on the left side.

According to an embodiment, the first object display area 2110 may include at least one first object 2111. The first object 2111 may include, for example, at least one of a notification bar, a status indicator, a signal intensity indicator, a battery capacity indication, or an app search window 2112. The second object display area 2130 may include at least one second object 2131. The second object 2131 may include, for example, at least one icon (for example, low-end menu). The third object display area 2120 may include at least one third object. The third object may include icon lists including at least one icon 2121.

According to an embodiment, if the app list screen of the electronic device 101 is changed from the closed state (a) on the left side to the open state (b) on the right side, the screen may include a first object display area 2110, a second object display area 2130, and a third object display area 2120, and the third object display area 2120 may be displayed with a vertical length, which is increased from F to F' in proportion to the increase of the vertical length of the screen from E to E'.

According to an embodiment, the first object display area 2110 in FIG. 21 may be an area to which real-time position compensation is not applied such that, even if the display of the electronic device 101 is opened or closed, the same is displayed according to the physical position of the display. For example, the first object 2111 in the first object display area 2110 may be displayed in the same physical position (on the upper end of the display) either in the closed state (a) or in the open state (b) as illustrated.

According to an embodiment, the second object display area 2130 may be an area to which real-time position compensation is applied such that, even if the physical position of the display is changed by opening or closing the display of the electronic device 101, the same is rendered after compensating for the coordinate value in proportion to the change, thereby providing the user with a visual experience which makes him/her feel as if there is no position change. For example, the second objects 2131 (for example, soft keys) in the second object display window 2130 may be displayed, even if the physical position of the display is changed, after position compensation so as to provide a visual effect which makes the same appear in fixed positions.

According to an embodiment, the third object display area 2120 may change the layout of GUI elements in response to a screen size increase. For example, if the display is opened, the same number of icons 2121 may be realigned and then displayed with the same size. According to various embodiments, if the icons 2121 are realigned, the interval between the icons 2121 in the horizontal direction may remain the same as m, but the interval in the vertical direction may increase from l to l'. For example, the vertical interval between icons 2121 arranged by 4×6 may change. As another example, the scale of the background image may change in response to a display size change.

Figure 22:
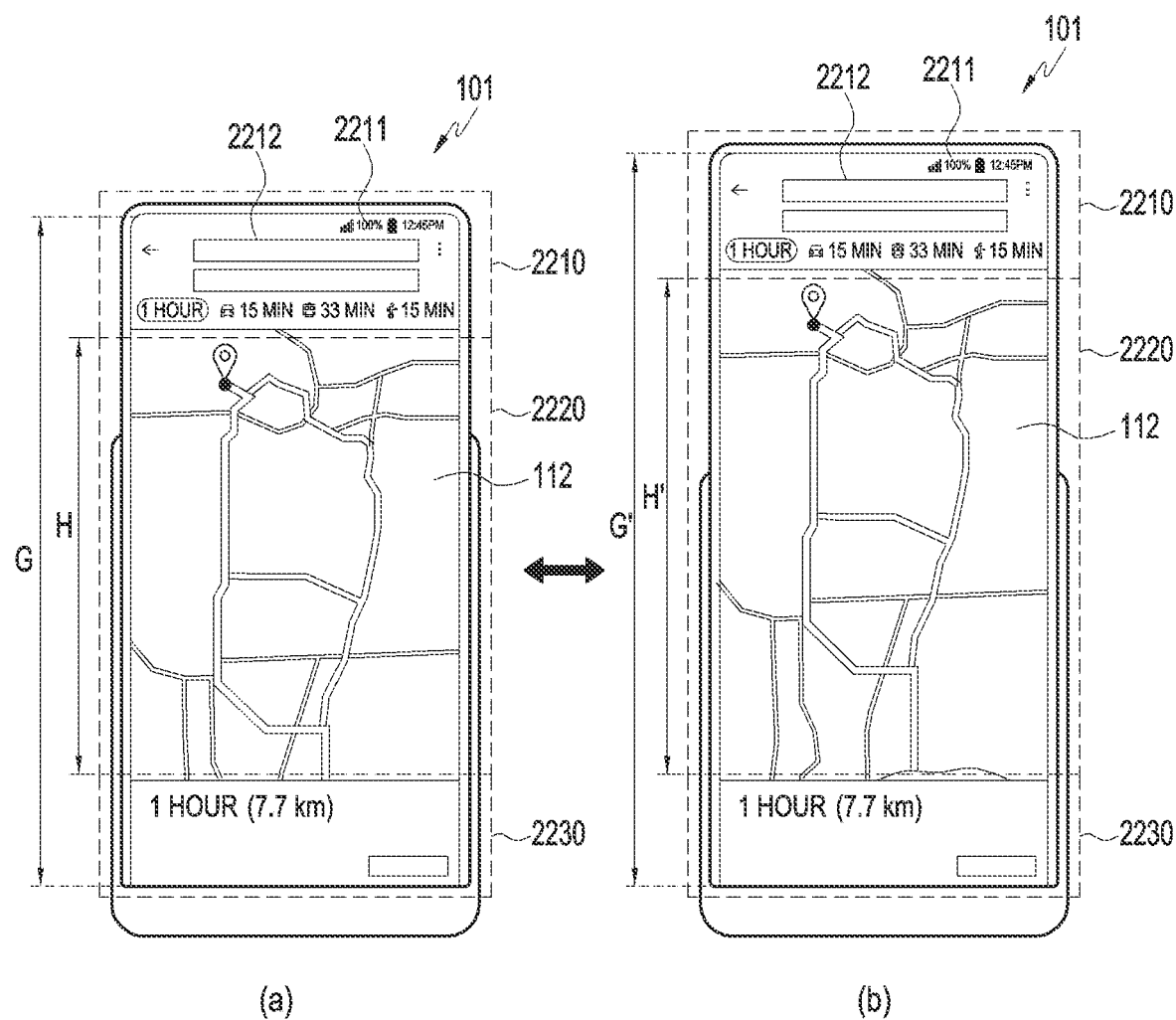
FIG. 22 is a diagram illustrating a screen of an electronic device, which is displayed according to whether the display is changed to an open state or to a closed state according to an embodiment of the disclosure.

FIG. 22 is a diagram illustrating a screen of an electronic device 101, which is displayed according to whether the display 112 is changed to an open state (b) or to a closed state (a) according to an embodiment of the disclosure.

Referring to FIG. 22, the electronic device 101 may display a navigation execution screen in the open state (b) or in the closed state (a).

According to an embodiment, the navigation execution screen of the electronic device 101 may include a first object display area 2210, a second object display area 2230, or a third object display area 2220 in the closed state (a) on the left side.

According to an embodiment, the first object display area 2210 may include at least one of first objects 2211 and 2212. The first objects 2211 and 2212 may include, for example, at least one of a notification bar, a status indicator, a signal intensity indicator, a battery capacity indication, a path search window, or a required time. The second object display area 2230 may include at least one second object. The second object may include, for example, at least one of a required time, a distance, or path information. A map image, for example, may be displayed in the third object display area 2220.

According to an embodiment, the navigation execution screen of the electronic device 101 may include a first object display area 2210, a second object display area 2230, or a third object display area 2220, and, if the same changes from the closed state (a) on the left side to the open state (b) on the right side, the third object display area 2220 may be displayed with a vertical length, which is increased from H to H' in proportion to the increase of the vertical length of the screen from G to G'.

According to an embodiment, the first object display area 2210 in FIG. 22 may be an area to which real-time position compensation is not applied such that, even if the display 112 of the electronic device 101 is opened or closed, the same is displayed according to the physical position of the display. For example, the first objects 2211 and 2212 in the first object display area 2210 may be displayed in the same physical position (on the upper end of the display) either in the closed state (a) or in the open state (b) as illustrated.

According to an embodiment, the second object display area 2230 may be an area to which real-time position compensation is applied such that, even if the physical position of the display is changed by expanding or contracting the display of the electronic device 101, the same is rendered after compensating for the coordinate value in proportion to the change, thereby providing the user with a visual experience which makes the user feel as if there is no position change. For example, the second objects in the second object display area 2230 may be displayed, even if the physical position of the display is changed, after position compensation so as to provide a visual effect which makes the same appear in fixed positions.

According to an embodiment, the third object display area 2220 may change the layout of GUI elements in response to a screen size increase. For example, if the display is expanded, the exposed area of the map may increase while remaining center-aligned around the reference position.

Figure 23:
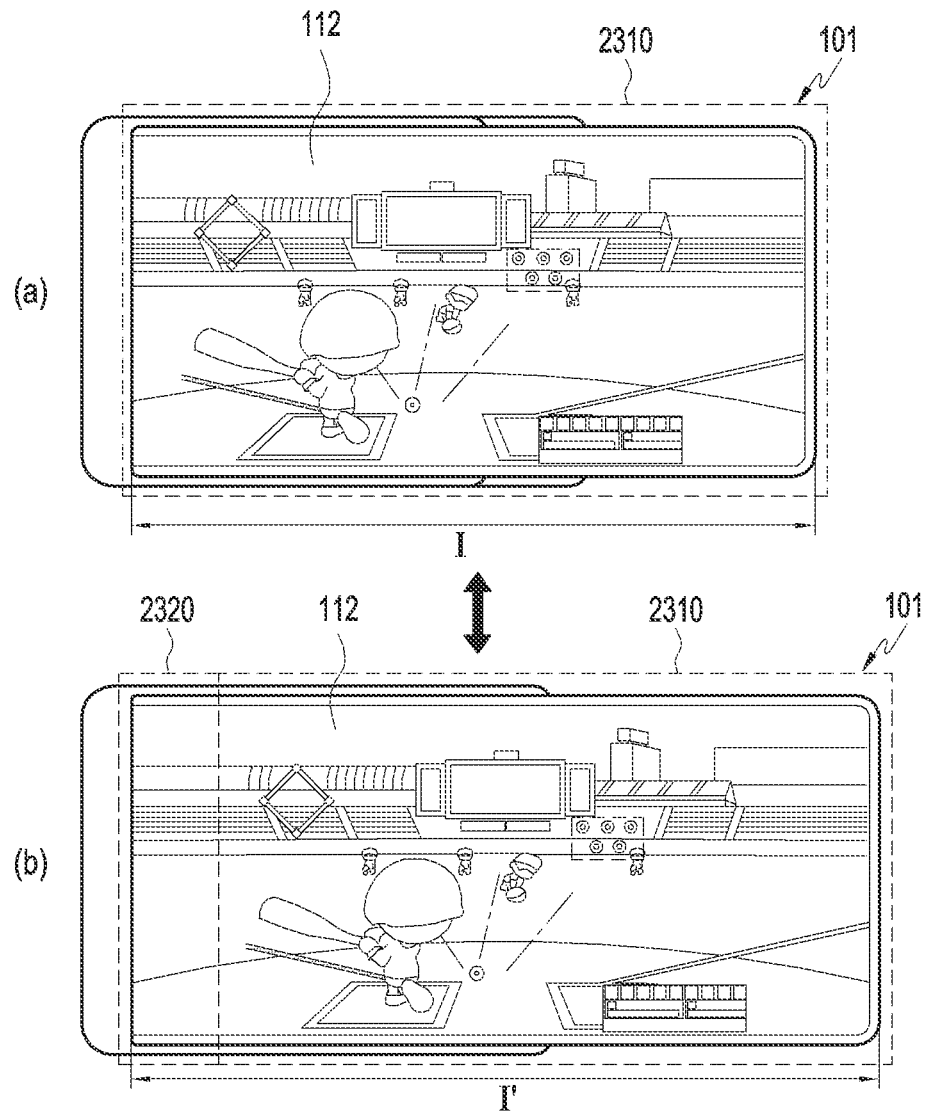
FIG. 23 is a diagram illustrating a screen of an electronic device, which is displayed according to whether the display is changed to an open state or to a closed state according to an embodiment of the disclosure.

FIG. 23 is a diagram illustrating a screen of an electronic device 101, which is displayed according to whether the display 112 is changed to an open state (b) or to a closed state (a) according to an embodiment of the disclosure.

Referring to FIG. 23, the electronic device 101 may display a game execution screen in the open state.

According to an embodiment, the game execution screen of the electronic device 101 may be displayed as a first area 2310 in the closed state (a) on the upper side. If the game execution screen of the electronic device 101 is changed from the closed state (a) to the open state (b), the screen size may increase from I to I', and the displayed game display area may increase in proportion to the increased area 2320. As the game execution screen is increased, the screen may be displayed while maintaining the center-alignment.

Figure 24:
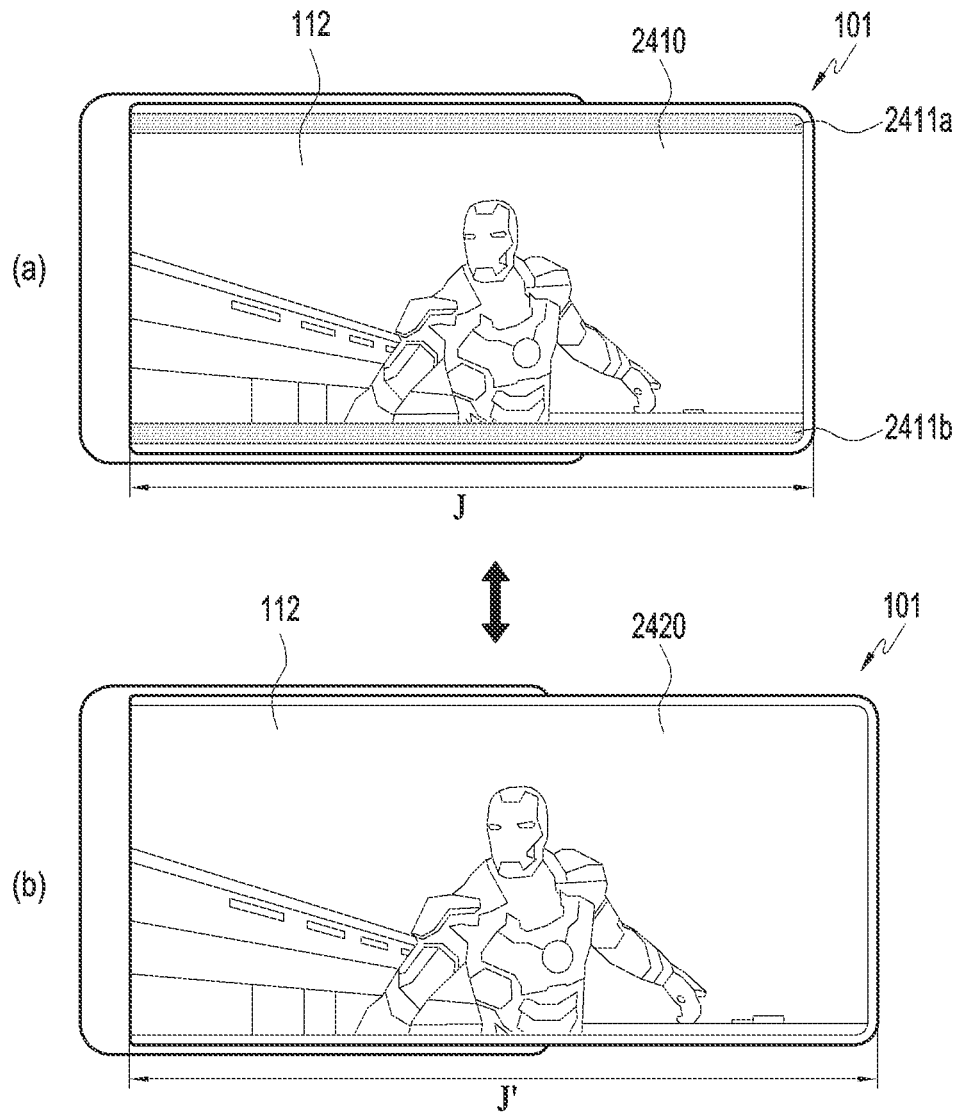
FIG. 24 is a diagram illustrating a screen of an electronic device, which is displayed according to whether the display is changed to an open state or to a closed state according to an embodiment of the disclosure.

FIG. 24 is a diagram illustrating a screen of an electronic device, which is displayed according to whether the display is changed to an open state (b) or to a closed state (a) according to an embodiment of the disclosure.

Referring to FIG. 24, the electronic device 101 may display a movie playback screen 2420 in the open state (b). The movie playback screen of the electronic device 101 may be displayed as a first area 2410 in the closed state (a). Since the first area 2410 is determined according to the screen ratio of the played movie, the same may not match with the horizontal-to-vertical ratio of the display. Accordingly, at least one of blank areas 2411a and 2411b may be added to a part of the first area 2410.

According to an embodiment, if the movie playback screen of the electronic device 101 is changed from the closed state (a) to the open state (b), the screen size may increase from J to J', and the first area 2410 may be expanded while maintaining the same screen ratio. As the first area 2410 is expanded while maintaining the same screen ratio, at least one of the blank areas 2411a and 2411b may be removed.

Figure 25:
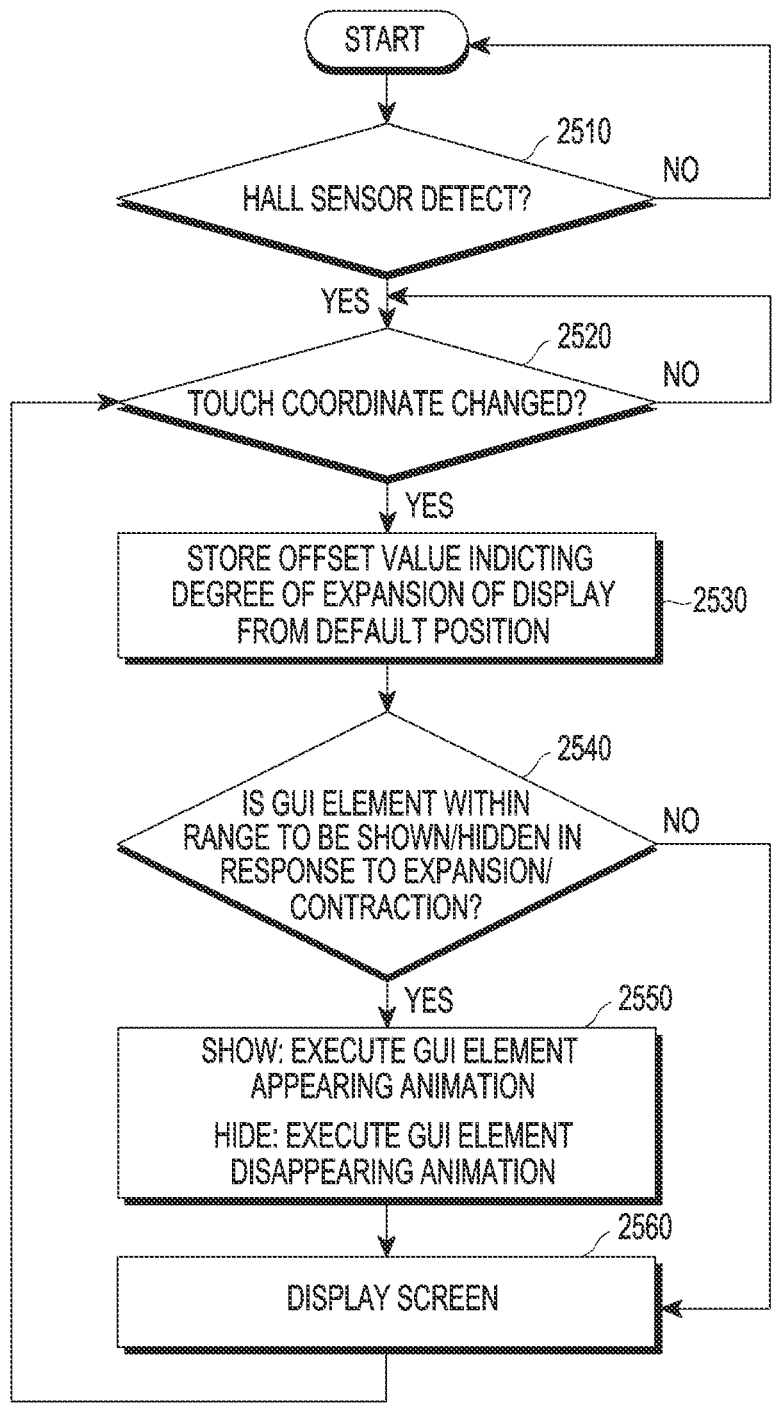
FIG. 25 is a flowchart illustrating an operation of an electronic device, according to whether the display is changed to an open state or to a closed state according to an embodiment of the disclosure.

FIG. 25 is a flowchart illustrating an operation of an electronic device according to various embodiments, according to whether the display is changed to an open state or to a closed state according to an embodiment of the disclosure.

Referring to FIG. 25, the processor 1210 may sense a movement of the electronic device, an open state thereof, or a closed state thereof through at least one sensor 1610 arranged on the electronic device 101. For example, when a hall sensor is sensed in operation 2510, the processor 1210 may determine whether or not the touch coordinate is changed in operation 2520.

When it is determined that the touch coordinate is changed, the processor 1210 may store an offset value which indicates the degree of expansion of the display from the default position in operation 2530.

In operation 2540, the processor 1210 may determine whether or not a GUI element is within a range to be shown or to be hidden in response to expansion or contraction of the screen. When it is determined that the GUI element is within a range to be shown or to be hidden, the processor 1210 may execute the corresponding animation effect in operation 2550. When it is not determined that the GUI element is within a range to be shown or to be hidden, the processor 1210 may not perform any separate animation effect. The processor 1210 may control display of the executed screen in operation 2560.

Figure 26:
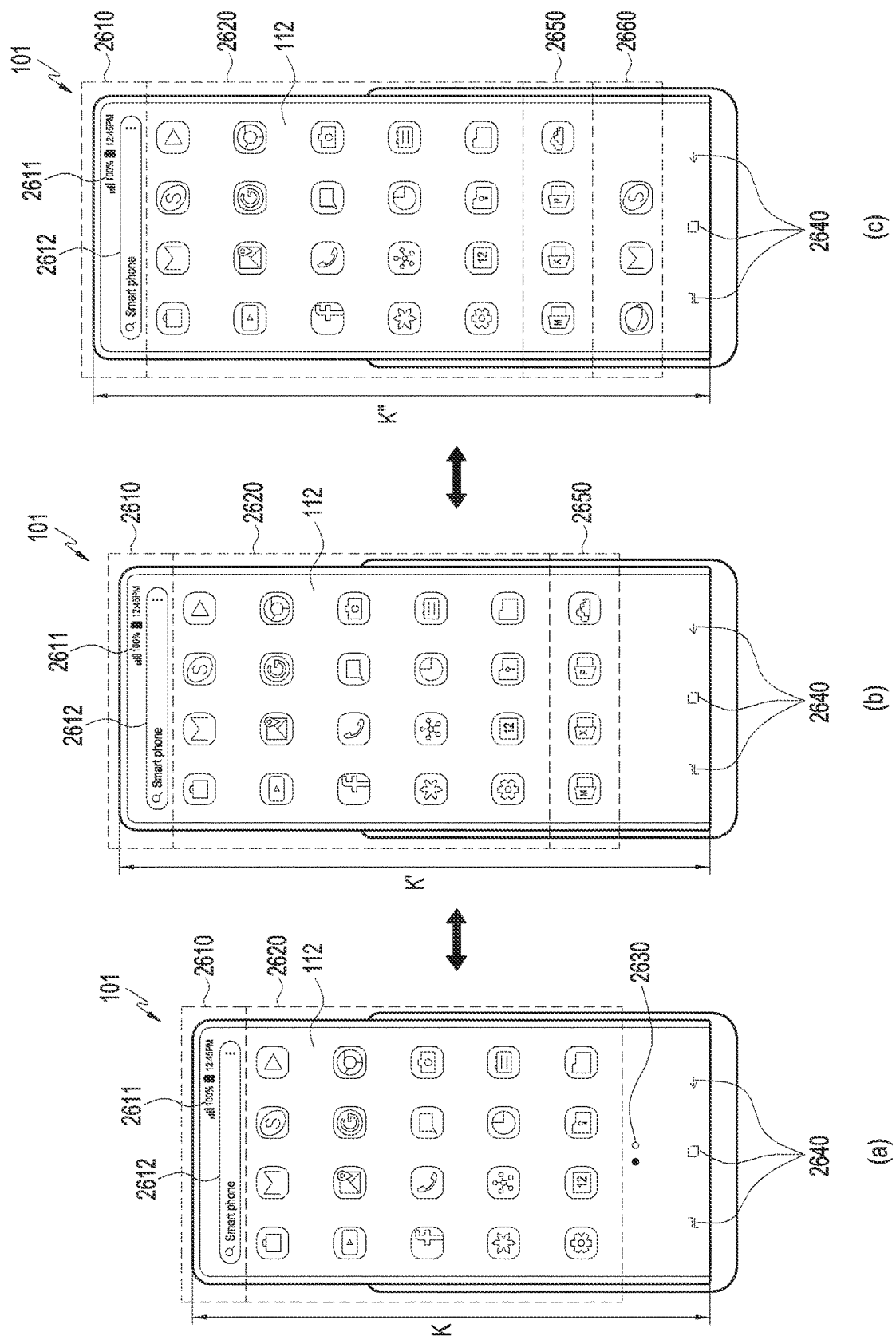
FIG. 26 is a diagram illustrating a screen of an electronic device, which is displayed according to whether the display is changed to an open state or to a closed state according to an embodiment of the disclosure.

FIG. 26 is a diagram illustrating a screen of an electronic device, which is displayed according to whether the display is changed to an open state (c) or to a closed state (a) according to an embodiment of the disclosure.

Referring to FIG. 26, the electronic device 101 may display an app list screen including multiple icons which can be used to execute corresponding applications, respectively, in the open state (c) or in the closed state (a).

According to an embodiment, the app list screen of the electronic device 101 may include a first object display area 2610, a second object display area 2630, or a third object display area 2620 in the closed state (a). The second object display area may include a third object 2640, such as at least one icon (for example, low-end menu).

According to an embodiment, the first object display area 2610 may include at least one first object 2611. The first object may include, for example, at least one of a notification bar, a status indicator, a signal intensity indicator, a battery capacity indication, or an app search window 2612.

According to an embodiment, if the app list screen of the electronic device 101 is changed from the closed state (a) to the middle state (b), the third object display area 2620 may further include a first increased area 2650 corresponding to the increase of the screen length from K to K'. Additional icons may be displayed in the first increased area 2650. According to various embodiments, the additionally displayed icons may not be displayed gradually as the area is slowly increased, but may generate such a visual effect that the same rapidly bounce from below once the area is increased enough to secure a predetermined icon display area. As another example, if the electronic device 101 is changed from the middle state (b) to the closed state (a), the first increased area 2650 decreases, and the added icons may generate such a visual effect that the same disappear rapidly once the area size becomes equal to or less than a threshold value.

According to an embodiment, if the app list screen of the electronic device 101 is changed from the middle state (b) to the open state (c) on the right side, the third object display area 2620 may include a first increased area 2650 and a second increased area 2660 in response to the increase of the screen length from K to K". Additional icons may be displayed in the second increased area 2660. According to various embodiments, the additionally displayed icons may not be displayed gradually as the third object display area 2620 is slowly increased, but may generate such a visual effect that the same rapidly bounce from below once the area is increased enough to secure a predetermined icon display area. As another example, if the electronic device 101 is changed from the open state (c) to the middle state (b) or from the middle state (b) to the closed state (a), the increased area 2660 decreases, and the added icons may generate such a visual effect that the same disappear rapidly once the area size becomes equal to or less than a threshold value.

Figure 27:
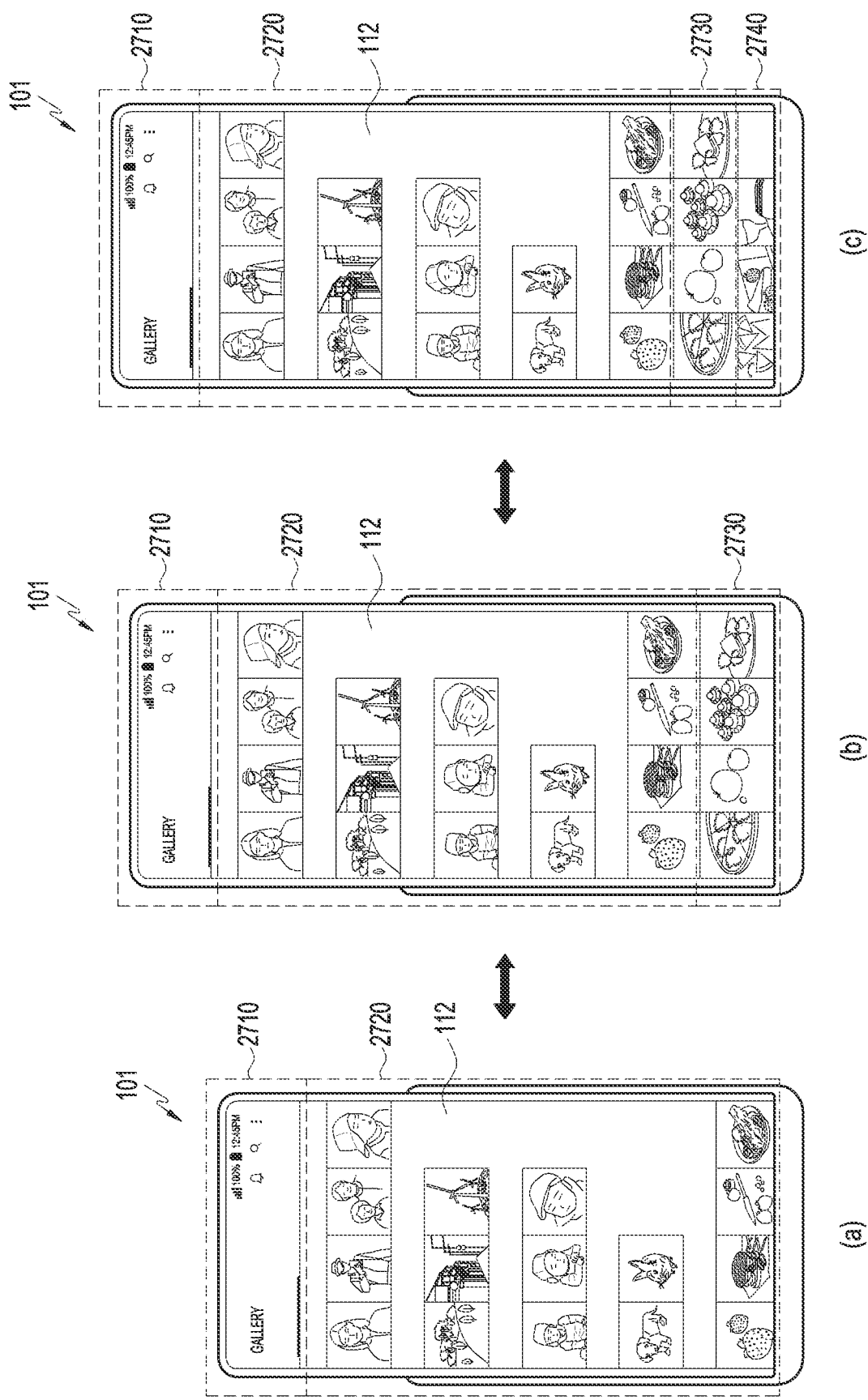
FIG. 27 is a diagram illustrating a screen of an electronic device according to various embodiments, which is displayed according to whether the display is changed to an open state or to a closed state according to an embodiment of the disclosure.
Figure 28:
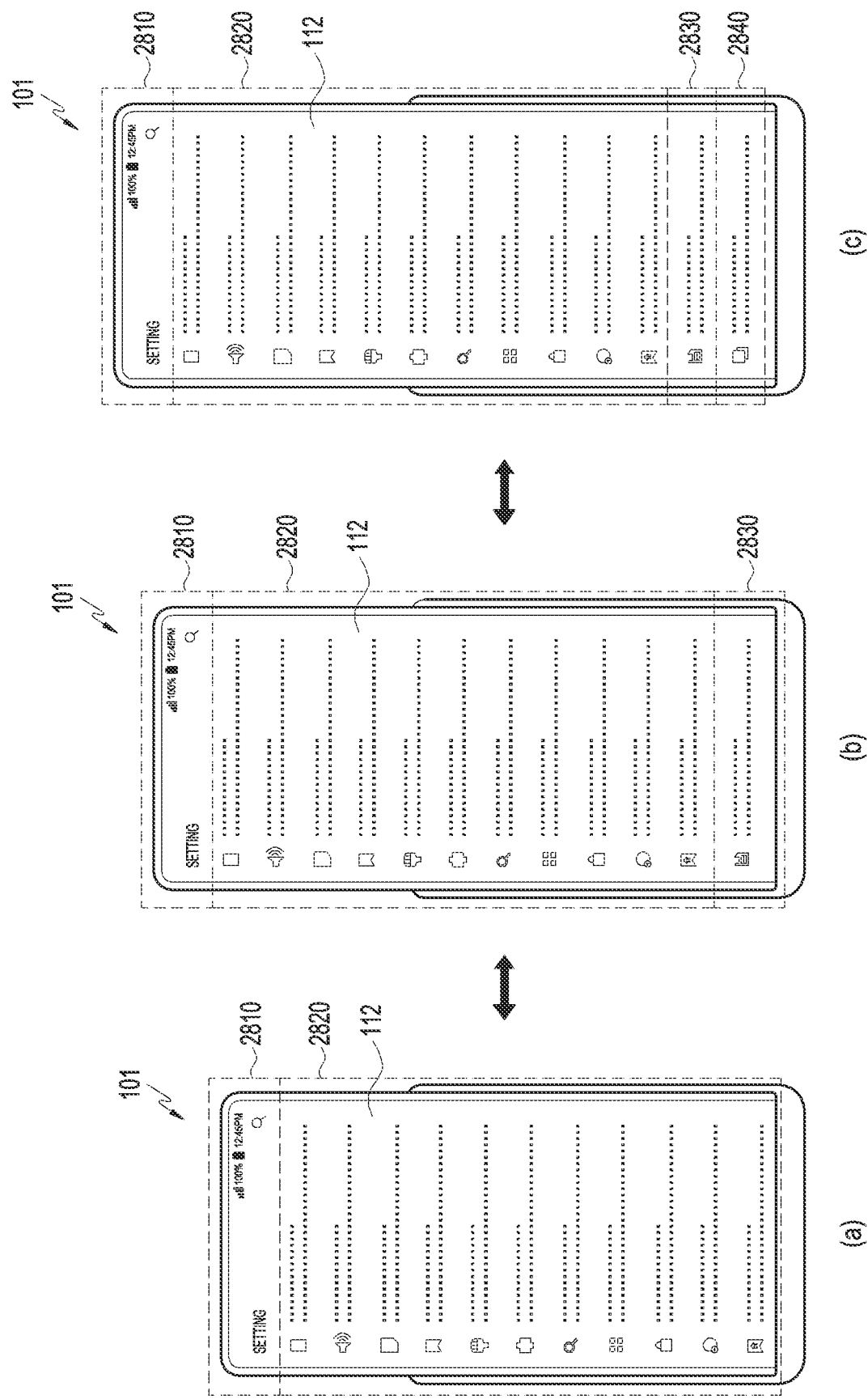
FIG. 28 is a diagram illustrating a screen of an electronic device according to various embodiments, which is displayed according to whether the display is changed to an open state or to a closed state according to an embodiment of the disclosure.

FIG. 27 illustrates an example of applying the effect illustrated in FIG. 26 to a gallery application execution screen, and FIG. 28 illustrates an example of applying the same to a setting screen according to an embodiment of the disclosure.

Referring to FIG. 27, the gallery application execution screen of the electronic device 101 may include a first object display area 2710 or a second object display area 2720 in the closed state (a). As the gallery application execution screen of the electronic device 101 is changed from the closed state (a) to the middle state (b) and changed from the middle state (b) to the open state (c), the second object display area 2720 may further include increased areas 2730 and 2740 in response to the screen size increase. Thumbnail images may be further displayed in the increased areas 2730 and 2740, and may provide substantially the same visual effect as described above with reference to FIG. 26.

FIG. 28 is a diagram illustrating a screen of an electronic device according to various embodiments, which is displayed according to whether the display is changed to an open state or to a closed state according to an embodiment of the disclosure.

Referring to FIG. 28, the setting screen of the electronic device 101 may include a first object display area 2810 and a second object display area 2820 in the closed state (a). As the setting screen of the electronic device 101 is changed from the closed state (a) to the middle state (b) and changed from the middle state (b) to the open state (c), the second object display area 2820 may further include increased areas 2830 and 2840 in response to the screen size increase. Setting menus may be further displayed in the increased areas 2830 and 2840, and may provide substantially the same visual effect as described above with reference to FIG. 26.

Figure 29:
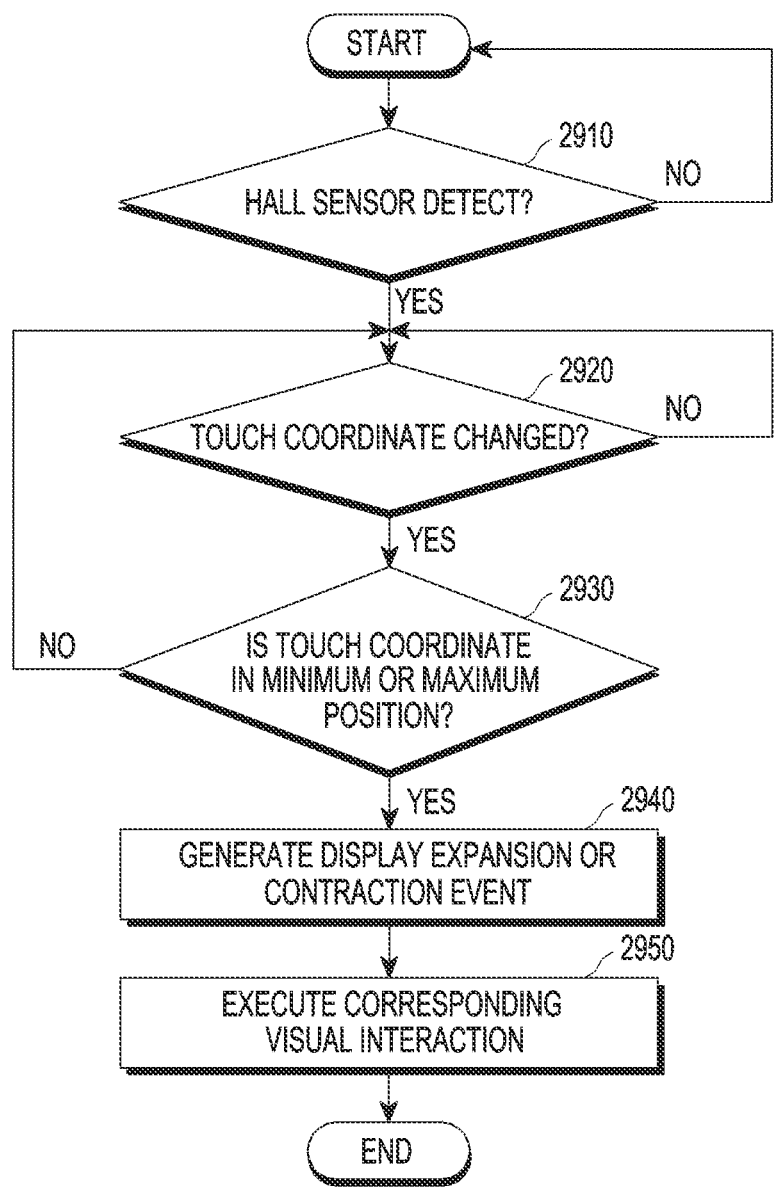
FIG. 29 is a flowchart illustrating an operation of an electronic device according to various embodiments, according to whether the display is changed to an open state or to a closed state according to an embodiment of the disclosure.

FIG. 29 is a flowchart illustrating an operation of an electronic device, according to whether the display is changed to an open state or to a closed state according to an embodiment of the disclosure.

Referring to FIG. 29, the processor 1210 may sense a movement of the electronic device, an open state thereof, or a closed state thereof through at least one sensor 1610 arranged on the electronic device 101. For example, if a hall sensor is detected in operation 2910, the processor 1210 may determine whether or not the touch coordinate is changed in operation 2920.

If it is determined that the touch coordinate is changed, the processor 1210 may determine whether the touch coordinate is in the minimum or maximum position with reference to the vertical axis of the screen in operation 2930.

According to the result of determination, the processor 1210 may generate a display expansion or contraction event in operation 2940. The processor 1210 may execute the corresponding visual effect in operation 2950.

Figure 30:
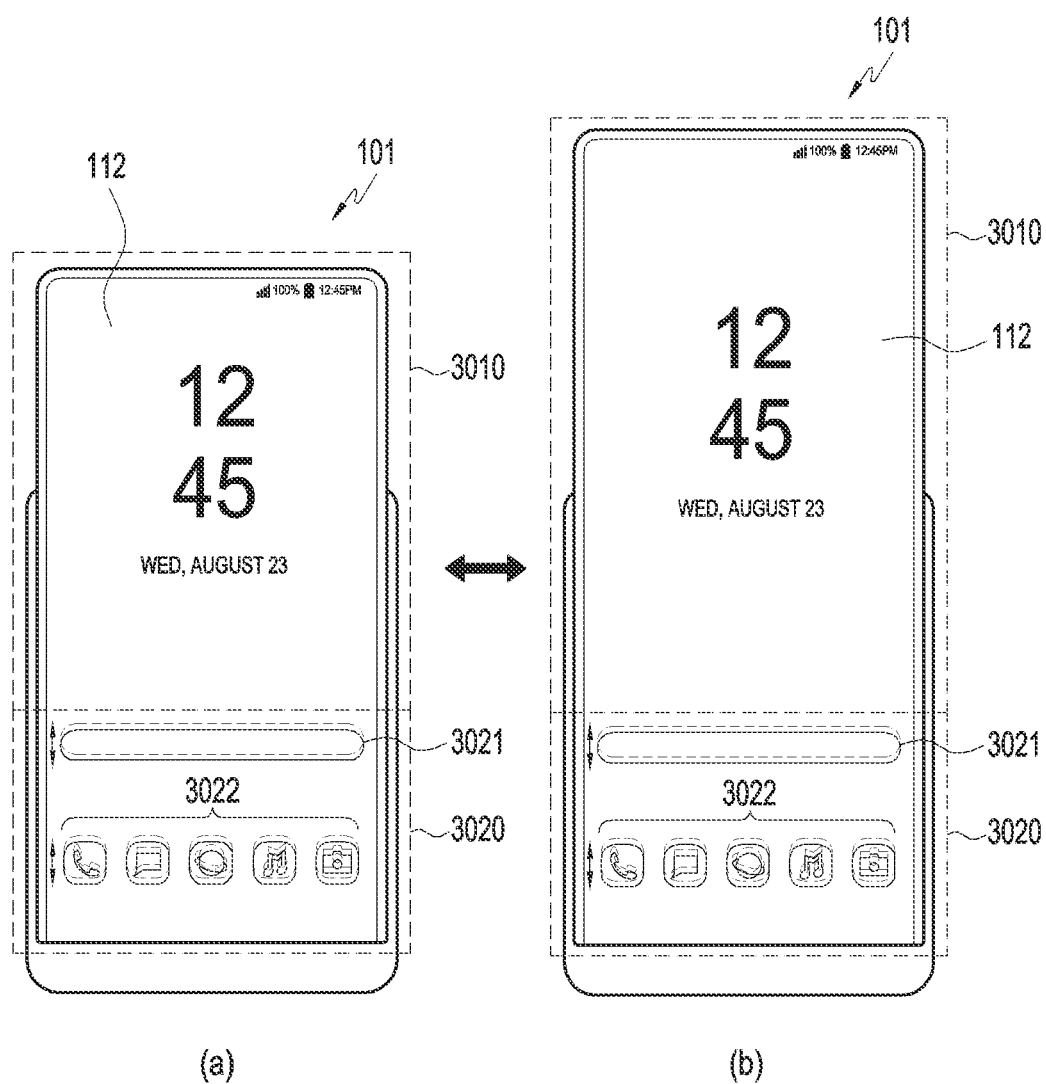
FIG. 30 is a diagram illustrating an screen of an electronic device according to various embodiments, which is displayed according to whether the display is changed to an open state or to a closed state according to an embodiment of the disclosure.

FIG. 30 is a diagram illustrating a screen of an electronic device, which is displayed according to whether the display is changed to an open state (b) or to a closed state (a) according to an embodiment of the disclosure.

Referring to FIG. 30, the electronic device 101 may display a screen in the open state (b) or in the closed state (a).

According to an embodiment, the screen of the electronic device 101 may include a first object display area 3010 or a second object display area 3020 in the closed state (a).

According to various embodiments, the second object display area 3020 may include at least one second object 3021 and 3022. The second object may include, for example, a search window 3021 or at least one icon 3022 (for example, a telephone app icon, an email icon, a text message app icon, a contact list app icon, an Internet browser app icon, or an application screen switching icon).

According to an embodiment, if the screen of the electronic device 101 is changed from the closed state (a) to the open state (b), the moment at which the display is expanded or contracted may be determined by determining whether a touch coordinate sensed by a sensor reaches the maximum or minimum position with regard to the vertical axis of the screen. For example, if the electronic device 101 reaches the open state (b) or the closed state (a), a visual effect configured to correspond to that moment may be provided.

According to various embodiments, the visual effect may form an animation by applying a physical effect, such as an action and a reaction, or the direction of a force to a GUI element such that, by expressing a physical motion realistically on the screen according to the open state (b) and the closed state (a), the PUI and the GUI are integrated. According to various embodiments, the animation may be implemented as a position change of the y-coordinate while having decelerating interpolation. For example, a time difference may be given between motions of respective objects or object display areas so as to provide a UI that gives rhythmical and ample impressions.

Figure 31:
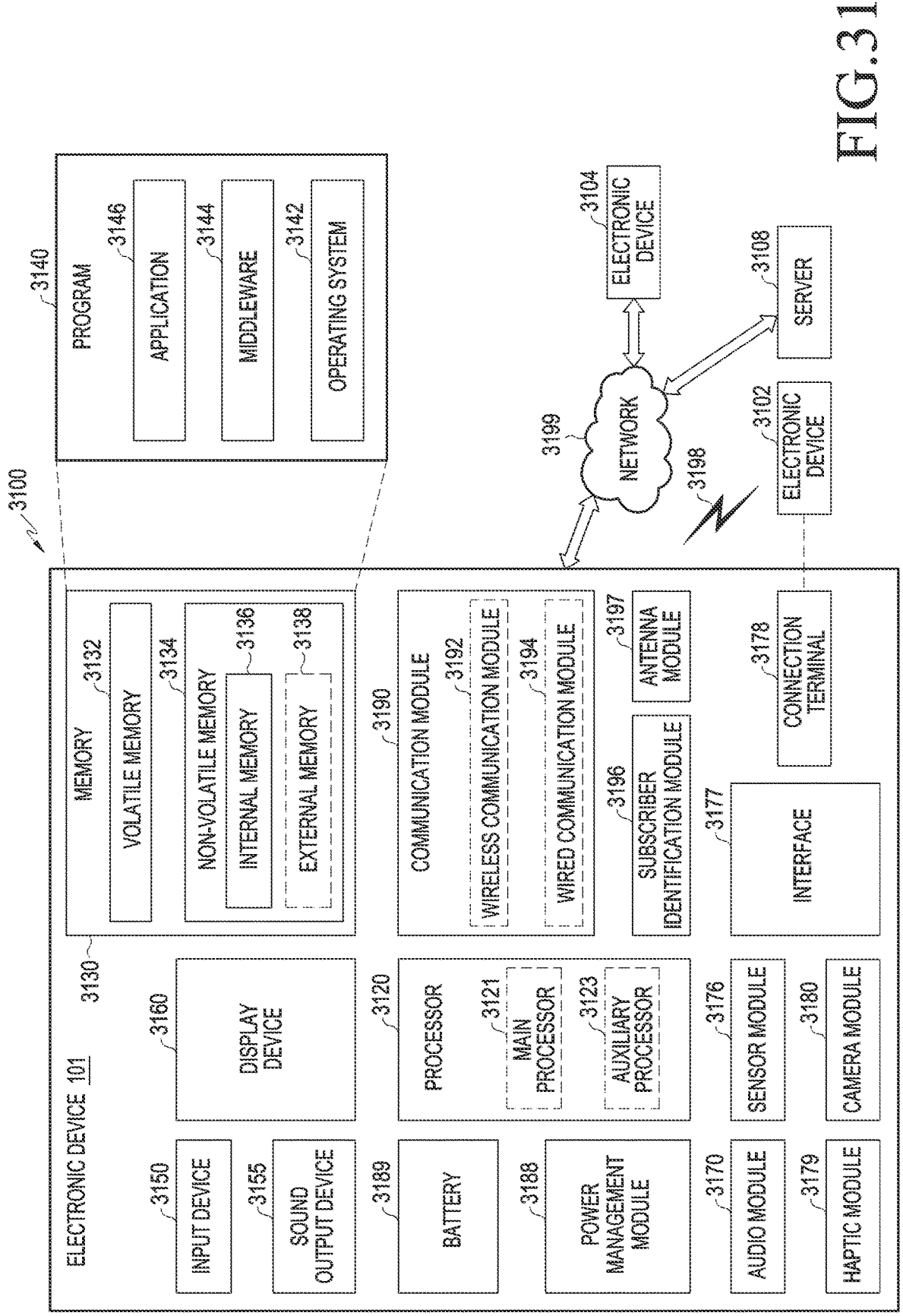
FIG. 31 is a diagram illustrating a network environment according to an embodiment of the disclosure.

FIG. 31 is a block diagram illustrating an electronic device 101 in a network environment 3100 according to an embodiment of the disclosure.

Referring to FIG. 31, the electronic device 101 in the network environment 3100 may communicate with an electronic device 3102 via a first network 3198 (e.g., a short-range wireless communication network), or an electronic device 3104 or a server 3108 via a second network 3199 (e.g., a long-range wireless communication network). According to an embodiment, the electronic device 101 may communicate with the electronic device 3104 via the server 3108. According to an embodiment, the electronic device 101 may include a processor 3120, memory 3130, an input device 3150, a sound output device 3155, a display device 3160, an audio module 3170, a sensor module 3176, an interface 3177, a haptic module 3179, a camera module 3180, a power management module 3188, a battery 3189, a communication module 3190, a subscriber identification module (SIM) 3196, or an antenna module 3197. In some embodiments, at least one (e.g., the display device 3160 or the camera module 3180) of the components may be omitted from the electronic device 101, or one or more other components may be added in the electronic device 101. In some embodiments, some of the components may be implemented as single integrated circuitry. For example, the sensor module 3176 (e.g., a fingerprint sensor, an iris sensor, or an illuminance sensor) may be implemented as embedded in the display device 3160 (e.g., a display).

The processor 3120 may execute, for example, software (e.g., a program 3140) to control at least one other component (e.g., a hardware or software component) of the electronic device 101 coupled with the processor 3120, and may perform various data processing or computation. According to one embodiment, as at least part of the data processing or computation, the processor 3120 may load a command or data received from another component (e.g., the sensor module 3176 or the communication module 3190) in volatile memory 3132, process the command or the data stored in the volatile memory 3132, and store resulting data in non-volatile memory 3134. The non-volatile memory 3134 may include internal memory 3136 and external memory 3138. According to an embodiment, the processor 3120 may include a main processor 3121 (e.g., a central processing unit (CPU) or an application processor (AP)), and an auxiliary processor 3123 (e.g., a graphics processing unit (GPU), an ISP, a sensor hub processor, or a communication processor (CP)) that is operable independently from, or in conjunction with, the main processor 3121. Additionally or alternatively, the auxiliary processor 3123 may be adapted to consume less power than the main processor 3121, or to be specific to a specified function. The auxiliary processor 3123 may be implemented as separate from, or as part of the main processor 3121.

The auxiliary processor 3123 may control at least some of functions or states related to at least one component (e.g., the display device 3160, the sensor module 3176, or the communication module 3190) among the components of the electronic device 101, instead of the main processor 3121 while the main processor 3121 is in an inactive (e.g., sleep) state, or together with the main processor 3121 while the main processor 3121 is in an active state (e.g., executing an application). According to an embodiment, the auxiliary processor 3123 (e.g., an ISP or a communication processor) may be implemented as part of another component (e.g., the camera module 3180 or the communication module 3190) functionally related to the auxiliary processor 3123.

The memory 3130 may store various data used by at least one component (e.g., the processor 3120 or the sensor module 3176) of the electronic device 101. The various data may include, for example, software (e.g., the program 3140) and input data or output data for a command related thereto. The memory 3130 may include the volatile memory 3132 or the non-volatile memory 3134.

The program 3140 may be stored in the memory 3130 as software, and may include, for example, an operating system (OS) 3142, middleware 3144, or an application 3146.

The input device 3150 may receive a command or data to be used by other component (e.g., the processor 3120) of the electronic device 101, from the outside (e.g., a user) of the electronic device 101. The input device 3150 may include, for example, a microphone, a mouse, a keyboard, or a digital pen (e.g., a stylus pen).

The sound output device 3155 may output sound signals to the outside of the electronic device 101. The sound output device 3155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 3160 may visually provide information to the outside (e.g., a user) of the electronic device 101. The display device 3160 may include, for example, a display, a hologram device, or a projector and control circuitry to control a corresponding one of the display, hologram device, and projector. According to an embodiment, the display device 3160 may include touch circuitry adapted to detect a touch, or sensor circuitry (e.g., a pressure sensor) adapted to measure the intensity of force incurred by the touch.

The audio module 3170 may convert a sound into an electrical signal and vice versa. According to an embodiment, the audio module 3170 may obtain the sound via the input device 3150, or output the sound via the sound output device 3155 or a headphone of an external electronic device (e.g., an electronic device 102) directly (e.g., wiredly) or wirelessly coupled with the electronic device 101.

The sensor module 3176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 3176 may include, for example, a gesture sensor, a gyro sensor, an atmospheric pressure sensor, a magnetic sensor, an acceleration sensor, a grip sensor, a proximity sensor, a color sensor, an IR sensor, a biometric sensor, a temperature sensor, a humidity sensor, or an illuminance sensor.

The interface 3177 may support one or more specified protocols to be used for the electronic device 101 to be coupled with the external electronic device (e.g., the electronic device 3102) directly (e.g., wiredly) or wirelessly. According to an embodiment, the interface 3177 may include, for example, a HDMI, a USB interface, a SD card interface, or an audio interface.

A connecting terminal 3178 may include a connector via which the electronic device 101 may be physically connected with the external electronic device (e.g., the electronic device 3102). According to an embodiment, the connecting terminal 3178 may include, for example, a HDMI connector, a USB connector, a SD card connector, or an audio connector (e.g., a headphone connector).

The haptic module 3179 may convert an electrical signal into a mechanical stimulus (e.g., a vibration or a movement) or electrical stimulus which may be recognized by a user via his tactile sensation or kinesthetic sensation. According to an embodiment, the haptic module 3179 may include, for example, a motor, a piezoelectric element, or an electric stimulator.

The camera module 3180 may capture a still image or moving images. According to an embodiment, the camera module 3180 may include one or more lenses, image sensors, image signal processors, or flashes.

The power management module 3188 may manage power supplied to the electronic device 101. According to one embodiment, the power management module 3188 may be implemented as at least part of, for example, a power management integrated circuit (PMIC).

The battery 3189 may supply power to at least one component of the electronic device 101. According to an embodiment, the battery 3189 may include, for example, a primary cell which is not rechargeable, a secondary cell which is rechargeable, or a fuel cell.

The communication module 3190 may support establishing a direct (e.g., wired) communication channel or a wireless communication channel between the electronic device 101 and the external electronic device (e.g., the electronic device 3102, the electronic device 3104, or the server 3108) and performing communication via the established communication channel. The communication module 3190 may include one or more communication processors that are operable independently from the processor 3120 (e.g., the application processor (AP)) and supports a direct (e.g., wired) communication or a wireless communication. According to an embodiment, the communication module 3190 may include a wireless communication module 3192 (e.g., a cellular communication module, a short-range wireless communication module, or a global navigation satellite system (GNSS) communication module) or a wired communication module 3194 (e.g., a local area network (LAN) communication module or a power line communication (PLC) module). A corresponding one of these communication modules may communicate with the external electronic device via the first network 3198 (e.g., a short-range communication network, such as Bluetooth™ wireless-fidelity (Wi-Fi) direct, or IR data association (IrDA)) or the second network 3199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 3192 may identify and authenticate the electronic device 101 in a communication network, such as the first network 3198 or the second network 3199, using subscriber information (e.g., international mobile subscriber identity (IMSI)) stored in the subscriber identification module 3196.

The antenna module 3197 may transmit or receive a signal or power to or from the outside (e.g., the external electronic device) of the electronic device 101. According to an embodiment, the antenna module 3197 may include an antenna including a radiating element composed of a conductive material or a conductive pattern formed in or on a substrate (e.g., PCB). According to an embodiment, the antenna module 3197 may include a plurality of antennas. In such a case, at least one antenna appropriate for a communication scheme used in the communication network, such as the first network 3198 or the second network 3199, may be selected, for example, by the communication module 3190 (e.g., the wireless communication module 3192) from the plurality of antennas. The signal or the power may then be transmitted or received between the communication module 3190 and the external electronic device via the selected at least one antenna. According to an embodiment, another component (e.g., a radio frequency integrated circuit (RFIC)) other than the radiating element may be additionally formed as part of the antenna module 3197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 3104 via the server 3108 coupled with the second network 3199. Each of the electronic devices 3102 and 3104 may be a device of a same type as, or a different type, from the electronic device 101. According to an embodiment, all or some of operations to be executed at the electronic device 101 may be executed at one or more of the external electronic devices 3102, 3104, or 3108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. The instruction, when executed by a processor (e.g., the processor 1210), may be configured to enable the one or more processors to execute the function corresponding to the instruction. The computer-readable storage medium may be, for example, the memory 1240.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

According to various embodiments, a storage medium stores instructions configured to cause, when executed by at least one processor, the at least one processor to perform at least one operation including: an operation of displaying at least one first object in a first area of a planar portion and displaying at least one second object in a second area of the planar portion in a closed state; and an operation of displaying the at least one first object in the first area and displaying the at least one second object in a third area of a bendable portion in an open state.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first structure comprising a first plate comprising a first surface and a second surface facing in an opposite direction to the first surface;
a second structure comprising:
a second plate facing the second surface of the first plate,
a first sidewall which is perpendicular to the second plate,
a second sidewall which is perpendicular to the second plate and to the first sidewall, and
a third sidewall which is perpendicular to the first sidewall and to the second plate, and which is parallel with the second sidewall, the second plate, the first sidewall, the second sidewall, and the third sidewall forming a trough, one side of which is open, so as to contain at least a part of the first structure, a state of the first structure being able to be changed between a closed state and an open state with regard to the second structure according to a movement of the first structure in at least one first direction which is parallel with the second plate and with the second sidewall, the first structure being positioned at a first distance from the first sidewall in the closed state and being positioned at a second distance, which is larger than the first distance, from the first sidewall in the open state;
a flexible touchscreen display layer comprising:
a planar portion which extends across at least a part of the first surface, and which is mounted on the first surface, and
a bendable portion which extends from the planar portion such that, in the closed state, the bendable portion extending to a space between the first sidewall and the first structure, at least part of the bendable portion being pulled from the space when the state of the first structure is changed from the closed state to the open state such that, when seen from above the first plate,
the at least part of the bendable portion forms a substantially planar surface between the planar portion and the first sidewall;
a processor operatively connected to the flexible touchscreen display layer; and
a memory operatively connected to the processor,
wherein the memory stores instructions that when executed, enable the processor to:
while the state of the first structure is the closed state, display at least one first object in a first area of the planar portion and display at least one second object in a second area of the planar portion to be located at a third distance from the first sidewall, and display at least one third object in a first portion of an execution screen of an application between the at least one first object and the at least one second object, and
maintain displaying the at least one first object in the first area,
move the at least one second object to be located at the third distance from the first sidewall, and
display the at least one third object in the first portion of the execution screen and a second portion of the execution screen between the at least one first object and the at least one second object while the state of the first structure is changed from the closed state to the open state, wherein the at least one second object is displayed on the bendable portion and size of the at least one second object is maintained while the at least one second object is moved,
wherein the second portion is refrained from being displayed while the state of the first structure is the closed state, and
wherein the at least one second object is not associated with the application.

2. The electronic device of claim 1, wherein the distance between the second area of the planar portion and a third area of the bendable portion is smaller than the distance between the first area and the third area.

3. The electronic device of claim 1, wherein the instructions further enable the processor to linearly move the at least one second object from the second area to a third area of the bendable portion in response to a movement of the first structure with regard to the second structure while the state of the first structure is changed from the closed state to the open state.

4. The electronic device of claim 1, wherein the at least one first object comprises at least one of a notification bar, a status indicator, a signal intensity indicator, or a battery capacity indication.

5. The electronic device of claim 1, wherein the at least one second object comprises at least one of a telephone app icon, an email icon, a text message app icon, a contact list app icon, an Internet browser app icon, or an application screen switching icon.

6. The electronic device of claim 1, wherein the first sidewall comprises a surface facing the trough and a dielectric protrusion formed on the surface.

7. The electronic device of claim 6, wherein the instructions further enable the processor to:
identify the dielectric protrusion by using the bendable portion of the flexible touchscreen display layer, and
determine the position of the first structure with regard to the second structure at least partially based on the identified dielectric protrusion.

8. The electronic device of claim 7, wherein the instructions further enable the processor to move the at least one second object on the flexible touchscreen display layer at least partially based on a movement of the determined position.

9. The electronic device of claim 1,
wherein the third object comprises multiple icons, and
wherein the instructions further enable the processor to arrange adjacent icons among the multiple icons at a larger interval while the state of the first structure is changed from the closed state to the open state.

10. The electronic device of claim 1,
wherein the instructions further enable the processor to crop at least a part of the execution screen in proportion to a reduced area of the planar portion while the state of the first structure is changed from the open state to the closed state.

11. The electronic device of claim 1,
wherein the third object comprises a first number of objects, and
wherein the instructions further enable the processor to arrange a second number of objects, the second number being larger than the first number, while the state of the first structure is changed from the closed state to the open state.

12. The electronic device of claim 11, wherein the third object comprises at least one of an icon, a thumbnail, an image, or text.

13. The electronic device of claim 1, wherein the instructions further enable the processor to repeatedly move the at least one second object upward/downward or leftward/rightward within a designated time when it is sensed that the state of the first structure has changed and reached a maximum closed state or a maximum open state.

14. A method of operating an electronic device comprising a flexible display, the method comprising:
while a state of the electronic device is a closed state,
displaying at least one first object in a first area of a planar portion of the flexible display,
displaying at least one second object in a second area of the planar portion to be located at a first distance from a bottom edge of a first housing of the electronic device, and
displaying at least one third object in a first portion of an execution screen of an application between the at least one first object and the at least one second object, and
while the state of the electronic device is changed from the closed state to an open state,
maintaining displaying the at least one first object in the first area,
moving the at least one second object to be located at the first distance from the bottom edge of the first housing of the electronic device, and
displaying the at least one third object in the first portion of the execution screen and a second portion of the execution screen between the at least one first object and the at least one second object,
wherein while the at least one second object is moved,
the at least one second object is displayed on a bendable portion of the flexible display, and
size of the at least one second object is maintained, and
wherein while the state of the electronic device is the closed state, the second portion is refrained from being displayed, and
wherein the at least one second object is not associated with the application.

15. The method of claim 14, wherein the distance between the second area of the planar portion and a third area of the bendable portion is smaller than the distance between the first area and the third area.

16. The method of claim 14, wherein the at least one second object comprises at least one of a telephone app icon, an email icon, a text message app icon, a contact list app icon, an Internet browser app icon, an application screen switching icon.

17. The method of claim 14, wherein the third object comprises multiple icons, and
wherein adjacent icons, among multiple icons displayed on the flexible display, are arranged at a larger interval in response to an increase in size of the flexible display which is exposed to the outside.

18. The method of claim 14, wherein in response to a decrease in size of the flexible display, which is exposed to the outside, at least a part of the execution screen is cropped in proportion to a reduced area of the flexible display.

19. The method of claim 14, wherein the third object comprises a first number of objects, and
wherein a second number of objects are arranged, the second number being larger than the first number, while the state of the electronic device is changed from the closed state to the open state.

20. The method of claim 14, wherein the at least one second object is repeatedly moved upward/downward or leftward/rightward within a designated time when it is determined that the flexible display has reached a maximum closed state or a maximum open state.

* * * * *